United States Patent
Hagio et al.

(10) Patent No.: US 10,001,584 B2
(45) Date of Patent: Jun. 19, 2018

(54) OPTICAL FILM, AND POLARIZING PLATE AND LIQUID CRYSTAL DISPLAY DEVICE THAT USE THIS OPTICAL FILM

(71) Applicant: FUJIFILM Corporation, Tokyo (JP)

(72) Inventors: Hiroyuki Hagio, Kanagawa (JP); Shinichi Ichikawa, Kanagawa (JP); Masaki Noro, Kanagawa (JP); Yu Naito, Kanagawa (JP); Nobutaka Fukagawa, Kanagawa (JP); Yutaka Nozoe, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 247 days.

(21) Appl. No.: 15/008,990

(22) Filed: Jan. 28, 2016

(65) Prior Publication Data

US 2016/0187537 A1    Jun. 30, 2016

Related U.S. Application Data

(63) Continuation of application No. PCT/JP2014/070135, filed on Jul. 30, 2014.

(30) Foreign Application Priority Data

Jul. 30, 2013  (JP) .................... 2013-158278

(51) Int. Cl.
*G02F 1/1335* (2006.01)
*G02B 1/04* (2006.01)
(Continued)

(52) U.S. Cl.
CPC .............. *G02B 1/04* (2013.01); *G02B 1/14* (2015.01); *G02B 5/3033* (2013.01); *G02F 1/133528* (2013.01); *Y10T 428/105* (2015.01)

(58) Field of Classification Search
CPC . B05D 3/067; G02B 1/04; G02B 1/14; G02B 5/3033; Y10T 428/1086; Y10T 428/105; G02F 1/133528
See application file for complete search history.

(56) References Cited

U.S. PATENT DOCUMENTS

2008/0113296 A1* 5/2008 Yamamoto ............ B41C 1/1016
                                                       430/280.1
2011/0273646 A1* 11/2011 Fukagawa .................. C08J 5/18
                                                        349/96

FOREIGN PATENT DOCUMENTS

JP          53-114857 A       10/1978
JP          53114857 A    *   10/1978
(Continued)

OTHER PUBLICATIONS

International Search Report issued in PCT/JP2014/070135 dated Oct. 7, 2014.

*Primary Examiner* — Sophie Hon
(74) *Attorney, Agent, or Firm* — Edwards Neils LLC; Jean C. Edwards, Esq.

(57) ABSTRACT

An optical film is provided containing cellulose acylate and at least one type of a compound denoted by the following Formula (I).

Formula (I)

$$R^1-L-\left(N\underset{(CH_2)_t-CO-X-R^2}{\overset{(CH_2)_s-COOH}{\diagup}}\right)_n$$

$R^1$ represents a hydrogen atom, an alkyl group, an alkenyl group, an aryl group, a heterocyclic group, an acyl group, an alkoxy carbonyl group, a carbamoyl group, an alkyl sulfonyl
(Continued)

group, or an aryl sulfonyl group, $R^2$ represents an alkyl group or an aryl group, L represents a single bond or a bivalent or more connecting group, and n represents 1 when L is a single bond and n represents an integer of the valence of L−1 when L is a bivalent or more connecting group. s and t each independently represent 1 to 3, and X represents —O— or —N(Ra)-. Ra represents a hydrogen atom or an alkyl group.

12 Claims, 2 Drawing Sheets

(51) Int. Cl.
*G02B 5/30* (2006.01)
*G02B 1/14* (2015.01)

(56) References Cited

FOREIGN PATENT DOCUMENTS

| JP | 2004-148811 A | 5/2004 |
| JP | 2011-118135 A | 6/2011 |
| JP | 2012-072348 A | 4/2012 |

* cited by examiner

OPTICAL FILM, AND POLARIZING PLATE AND LIQUID CRYSTAL DISPLAY DEVICE THAT USE THIS OPTICAL FILM

CROSS-REFERENCE TO RELATED APPLICATIONS

This application is a Continuation of PCT International Application No. PCT/JP2014/070135 filed on Jul. 30, 2014, which was published under PCT Article 21(2) in Japanese, which claims priority under 35 U.S.C. § 119 (a) to Japanese Patent Application No. 2013-158278 filed in Japan on Jul. 30, 2013. The above applications are hereby expressly incorporated by reference, in their entirety, into the present application.

BACKGROUND OF THE INVENTION

1. Field of the Invention

The present invention relates to an optical film, and a polarizing plate and a liquid crystal display device that use this optical film.

2. Description of the Related Art

An optical film such as a cellulose acylate film has been used in various liquid crystal display devices as an optical member of the liquid crystal display device, for example, a support of an optical compensation film, a protective film of a polarizing plate, and the like.

The liquid crystal display device has been used in indoor such as in a TV, and for example, has been increasingly used in outdoor mainly for a portable device. For this reason, a liquid crystal display device capable of withstanding high temperature and high humidity has been required to be developed from the related art.

In addition, a demand for the liquid crystal display device to be resistant to severe usage conditions in extensively various purposes has been increased, and annually, durability has been required to be at a higher level than that of the related art.

In addition, recently, the liquid crystal display device has been enlarged and thinned mainly for a TV, and according to this, the optical film which is a constituent member is required to be thin. From the related art, it has been important for the optical film to have suitable hardness and excellent cutting properties from a viewpoint of workability, and the thinned optical film is further required to have improved hardness and cutting properties.

In the optical film using the cellulose acylate film, it has been known that a specific compound is contained in the film in order to solve various problems in further improving performance, in properties as the optical film, or in manufacturing.

For example, in order to suppress a variation in retardation of the optical film due to environment humidity, an aliphatic monocarboxylic acid or an aromatic monocarboxylic acid, or an organic phosphoric acid, which has pKa of 2 to 7 (refer to JP2011-118135A) has been proposed, and in order to enhance peelability of a film obtained from a support body at the time of manufacturing a resin film by solvent casting methods and to enhance polarizer durability, it has been proposed that an iminodiacetic acid type organic carboxylic acid compound having two carboxy groups (the value of the pKa is less than or equal to 5.5) is contained in the optical film (refer to JP2012-72348A).

SUMMARY OF THE INVENTION

In the examination of the present inventors, by using the specific carboxylic acid or phosphoric acid disclosed in JP2011-118135A or JP2012-72348A, the polarizer durability under high temperature and high humidity or under high temperature and low humidity is enhanced, and the peelability from the support body in the solvent casting methods is considerably enhanced. However, when the compounds disclosed in JP2011-118135A and JP2012-72348A are used, it has been found that the polarizer durability and a haze suppression effect are not sufficient at the time of continuously performing evaluation for a long period of time under high temperature and high humidity or in severer conditions.

In addition, the compounds disclosed in JP2011-118135A and JP2012-72348A do not necessarily have sufficient compatibility with respect to cellulose acylate, and are volatilized from a cellulose acylate film in severe environmental conditions for a long period of time, and thus an effective concentration decreases, and haze occurs.

Accordingly, an object of the present invention is to provide an optical film in which volatility of a compound from a film is suppressed even under severe conditions for a long period of time under high temperature and high humidity, polarizer durability is able to be enhanced, and the occurrence of haze is suppressed in the optical film containing cellulose acylate, and a polarizing plate and a liquid crystal display device employing the optical film.

The present inventors have analyzed the reason that the compounds disclosed in JP2011-118135A and JP2012-72348A have an effect in the polarizer durability in the initial stage, but the effect decreases in aging for a long period of time or in severe conditions, and have found that it is because the compounds disclosed in JP2011-118135A and JP2012-72348A are volatilized from the cellulose acylate film in the severe environmental conditions as described above. That is, it has been found that an effective concentration of the compound in the film decreases, and thus the durability enhancement effect of the polarizer is reduced according to aging.

It has been considered that such a phenomenon that the compound is volatilized from the film occurs due to the fact that compatibility between the compound and cellulose acylate which coexists with the compound in the film is not necessarily sufficient or a mutual interaction between the added compound and the cellulose acylate is weak.

In addition, it has been considered that, in aging for a long period of time or in severe conditions, the phenomenon is relevant not only to the volatilization of the compound, but also to a change in moisture permeability with respect to the optical film, pKa of a carboxy group, a certain action of a carboxy group of the carboxylic acid compound itself, and the like.

For this reason, the present invention has been completed in which initial polarizer durability is enhanced by adding an organic acid having high pKa, and compatibility with respect to the cellulose acylate is improved.

According to intensive examinations of the present inventors from these knowledges, it has been found that a specific structure is effective in order to increase a mutual interaction with respect to the cellulose acylate. Accordingly, it has been found that the polarizer durability of the cellulose acylate film in aging in severe conditions, such as under high temperature and high humidity, is able to be improved, the volatilization of the compound from the optical film is able to be suppressed, and the occurrence of the haze is able to be suppressed.

That is, the object described above is attained by the following means.

<1> An optical film containing cellulose acylate and at least one type of a compound denoted by the following Formula (I).

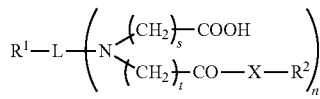

Formula (I)

In Formula (I), $R^1$ represents a hydrogen atom, an alkyl group, an alkenyl group, an aryl group, a heterocyclic group, an acyl group, an alkoxy carbonyl group, a carbamoyl group, an alkyl sulfonyl group, or an aryl sulfonyl group, and $R^2$ represents an alkyl group or an aryl group. L represents a single bond or a bivalent or more connecting group, and n represents 1 when L is a single bond and n represents an integer of the valence of L−1 when L is a bivalent or more connecting group. s and t each independently represent 1, 2, or 3. X represents —O— or —N(Ra)-. Here, Ra represents a hydrogen atom or an alkyl group.

<2> The optical film according to <1>, in which L is a single bond, an alkylene group, or an alkanetriyl group.

<3> The optical film according to <1> or <2>, in which L is an alkylene group.

<4> The optical film according to any one of <1> to <3>, in which the compound denoted by Formula (I) described above is a compound denoted by the following Formula (II).

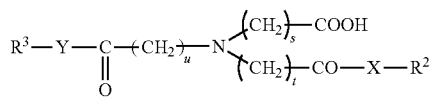

Formula (II)

In Formula (II), $R^2$ represents an alkyl group or an aryl group. s, t, and u each independently represent 1, 2, or 3. X and Y each independently represent —O— or —N(Ra)-. Here, Ra represents a hydrogen atom or an alkyl group. $R^3$ represents an alkyl group or an aryl group.

<5> The optical film according to any one of <1> to <4>, in which $R^2$ is an alkyl group which may be substituted with an aryl group or with a cycloalkyl group.

<6> The optical film according to any one of <1> to <5>, in which $R^2$ is denoted by the following Formula (1) or (2).

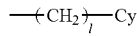

Formula (1)

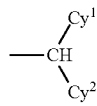

Formula (2)

In Formulas (1) and (2), l represents an integer of 1 to 5, and Cy, $Cy^1$, and $Cy^2$ each independently represent an aryl group or a cycloalkyl group.

<7> The optical film according to any one of <1> to <6>, in which a total degree of acyl substitution A of the cellulose acylate satisfies the following Formula.

$1.5 \leq A \leq 3.0$

<8> The optical film according to any one of <1> to <7>, in which an acyl group of the cellulose acylate is an acetyl group, and a total degree of acetyl substitution B satisfies the following Formula.

$2.0 \leq B \leq 3.0$

<9> The optical film according to <8>, in which the total degree of acetyl substitution B is greater than or equal to 2.5 and less than 2.97.

<10> The optical film according to any one of <1> to <9>, in which the optical film contains at least one type of a plasticizer.

<11> The optical film according to any one of <1> to <10>, in which the optical film is formed of at least two layers including a layer containing the cellulose acylate and at least one type of the compound denoted by Formula (I), and a hard coat layer.

<12> A polarizing plate including a polarizer; and the optical film according to any one of <1> to <11> on at least one surface of the polarizer.

<13> A liquid crystal display device, at least including the polarizing plate according to <12>; and a liquid crystal cell.

Herein, a numerical range denoted by using "to" indicates a range including numerical values described before and after "to" as a lower limit value and an upper limit value.

In addition, herein, a "group" described as each of the groups, unless otherwise stated, is used for indicating either a non-substitutional group or a group having a substituent group. For example, an "alkyl group" indicates an alkyl group which may have a substituent group. In addition, herein, an "aliphatic group" may be a straight-chain aliphatic group, a branched aliphatic group, or a cyclic aliphatic group, or may be a saturated aliphatic group or an unsaturated aliphatic group (which does not become an aromatic ring).

Herein, when a plurality of substituent groups or connecting groups (hereinafter, referred to as a substituent group and the like) are concurrently or selectively defined, the respective substituent groups and the like may be identical to each other or different from each other.

Accordingly, it is possible to provide an optical film containing cellulose acylate in which polarizer durability in aging in severe conditions, such as under high temperature and high humidity, is able to be improved, volatilization of a compound from the optical film is able to be suppressed, and the occurrence of haze is able to be suppressed, and a polarizing plate and a liquid crystal display device employing the optical film.

The above-described and other characteristics, and advantages of the present invention will be obvious from the following description with suitable reference to the drawings.

DESCRIPTION OF THE PREFERRED EMBODIMENTS

Figure 1:
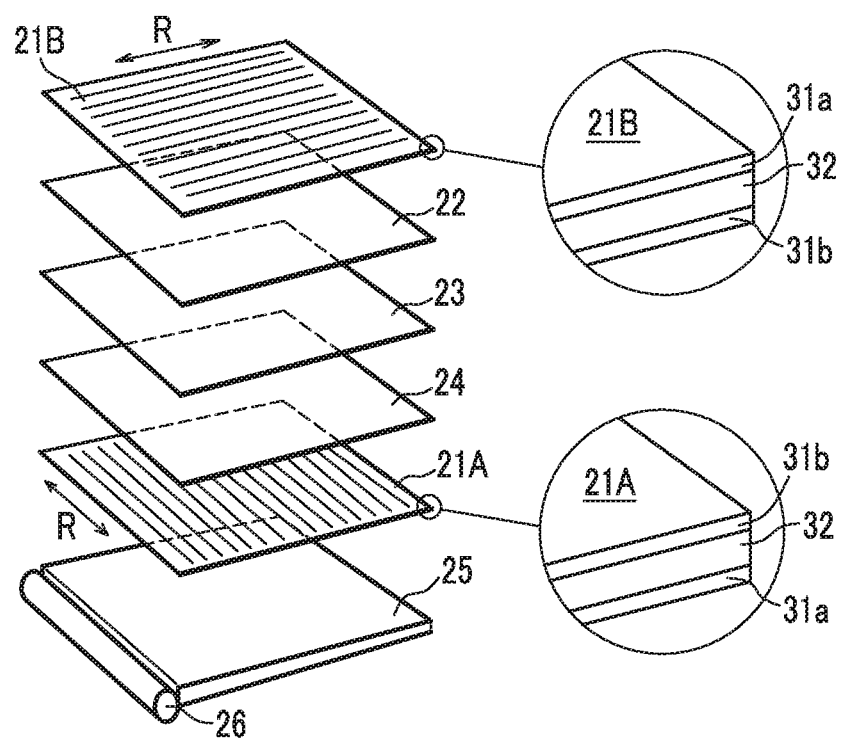
FIG. 1 is an example schematically illustrating an inner structure of a liquid crystal display device of the present invention.

Hereinafter, the present invention will be described in detail with reference to embodiments.

[Optical Film]

An optical film of the present invention is formed of at least one layer of a cellulose acylate film containing cellulose acylate and at least one type of a compound denoted by Formula (I). In addition, the optical film may be configured of a plurality of layers, and the compound denoted by Formula (I) may be contained in any one of the layers or in all layers.

Here, a cellulose acylate film or a cellulose acylate layer indicates that cellulose acylate is contained in a resin component configuring the film or the layer in the amount of greater than or equal to 50 mass %, and the content of the cellulose acylate in the resin component is preferably greater than or equal to 60 mass %, is more preferably greater than or equal to 70 mass %, is even more preferably greater than or equal to 80 mass %, is still more preferably greater than or equal to 85 mass %, is particularly preferably greater than or equal to 90 mass %, and is most preferably greater than or equal to 95 mass %.

On the other hand, in addition to the cellulose acylate film as described above, the optical film of the present invention may form a multi-layered configuration along with another layer in which the cellulose acylate is not contained as the resin component, or even when the cellulose acylate is contained, the content of the cellulose acylate is less than 50 mass % of the total resin component. Examples of such a layer include a functional layer specialized for a specific function, and examples of the functional layer include a hard coat layer and the like.

In addition to the hard coat layer, examples of the layer specialized for a specific function include an antiglare layer, a clear hard coat layer, an antireflection layer, an antistatic layer, an antifouling layer, and the like are. In a preferred aspect of the present invention, these layers are disposed on the hard coat layer.

The optical film of the present invention is useful for various purposes such as a polarizing plate protective film and a surface protective film arranged on an image display surface.

<<Cellulose Acylate Film>>

In the present invention, as described above, the cellulose acylate film is formed of a film in which a ratio of cellulose acylate in a resin constituent is greater than or equal to 50 mass %, and is the optical film of the present invention in the narrow sense.

The cellulose acylate film may be a single layer, or a laminated body of two or more layers. However, the layer herein indicates a layer which does not include the functional layer as described above, but contains cellulose acylate in the amount of greater than or equal to 50 mass % with respect to the total resin component. When the cellulose acylate film is a laminated body of two or more layers, it is preferable that the cellulose acylate film has a two-layer structure or a three-layer structure, and it is more preferable that the cellulose acylate film has the three-layer structure. When the cellulose acylate film has the three-layer structure, it is preferable that the cellulose acylate film includes a core layer of one layer (that is, the thickest layer, and hereinafter, also referred to as a base layer), and a skin layer A and a skin layer B interposing the core layer therebetween. That is, it is preferable that the cellulose acylate film of the present invention has a three-layer structure of the skin layer B/the core layer/the skin layer A. Such a laminated body is able to be manufactured by various known casting methods such as cocasting described below. The skin layer B is a layer which is in contact with a metal support body described below at the time of manufacturing the cellulose acylate film by using solvent casting methods, and the skin layer A is an air interface layer on a side opposite to the metal support body. Furthermore, the skin layer A and the skin layer B are collectively referred to as a skin layer (or a surface layer).

In the cellulose acylate film of the present invention, the degree of acyl substitution of the cellulose acylate in each of the layers may be homogeneous, or a plurality of cellulose acylates may be mixed in one layer. However, it is preferable that all of the degrees of acyl substitution of the cellulose acylate in each of the layers are constant from a viewpoint of adjusting optical properties. In addition, when the cellulose acylate film of the present invention has a three-layer structure, it is preferable that cellulose acylates having the same degree of acyl substitution are used as the cellulose acylates contained in the surface layers on both surface sides from a viewpoint of manufacturing costs.

In the present invention, the cellulose acylate film contains cellulose acylate and at least one type of a compound denoted by the following Formula (I).

<Compound Denoted by Formula (I)>

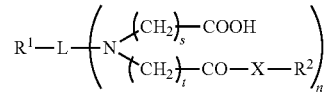

Formula (I)

In Formula (I), $R^1$ represents a hydrogen atom, an alkyl group, an alkenyl group, an aryl group, a heterocyclic group, an acyl group, an alkoxy carbonyl group, a carbamoyl group, an alkyl sulfonyl group, or an aryl sulfonyl group. $R^2$ represents an alkyl group or an aryl group. L represents a single bond or a bivalent or more connecting group, n represents 1 when L is a single bond and n represents an integer of the valence of L−1 when L is a bivalent or more connecting group. s and t each independently represent 1, 2, or 3. X represents —O— or —N(Ra)-. Here, Ra represents a hydrogen atom or an alkyl group.

In the alkyl group in $R^1$, the number of carbon atoms is preferably 1 to 30, is more preferably 1 to 24, and is even more preferably 1 to 20.

In the alkenyl group in $R^1$, the number of carbon atoms is preferably 2 to 30, is more preferably 2 to 24, and is even more preferably 2 to 20.

In the aryl group in $R^1$, the number of carbon atoms is preferably 6 to 30, is more preferably 6 to 24, and is even more preferably 6 to 20.

The heterocyclic group in $R^1$ is preferably a heterocyclic group having a 5-membered ring or a 6-membered ring, and in the ring, a benzene ring may be ring-condensed. In addition, it is preferable that a hetero atom configuring a hetero ring is an atom selected from a nitrogen atom, an oxygen atom, and a sulfur atom, and the hetero ring may be an aromatic ring, may be an unsaturated ring not the aromatic ring, or may be a saturated ring. The number of carbon atoms of the hetero ring is preferably 0 to 30, is more preferably 1 to 24, and is even more preferably 2 to 20.

The acyl group in $R^1$ may be any one of an aryl carbonyl group, an alkyl carbonyl group, an alkenyl carbonyl group, a heterocyclic carbonyl group, and a formyl group, and the carbon atoms of the acyl group is preferably 1 to 30, is more preferably 2 to 24, and is even more preferably 2 to 20.

In the alkoxy carbonyl group in $R^1$, the number of carbon atoms is preferably 2 to 30, is more preferably 2 to 24, and is even more preferably 2 to 20.

The carbamoyl group in $R^1$ may be any one of a carbamoyl group, a N-alkyl carbamoyl group, a N,N-dialkyl carbamoyl group, a N-aryl carbamoyl group, a N,N-diaryl carbamoyl group, and a N-alkyl-N-aryl carbamoyl group, and the number of carbon atoms of the carbamoyl group is preferably 1 to 30, is more preferably 2 to 24, and is even more preferably 2 to 20.

In the alkyl sulfonyl group in $R^1$, the number of carbon atoms is preferably 1 to 30, is more preferably 1 to 24, and is even more preferably 1 to 20.

In the aryl sulfonyl group in $R^1$, the number of carbon atoms is preferably 6 to 30, is more preferably 6 to 24, and is even more preferably 6 to 20.

Each of the groups in $R^1$ described above may have a substituent group.

Such a substituent group is not particularly limited, and examples of the substituent group include an alkyl group (preferably an alkyl group having 1 to 10 carbon atoms, for example, methyl, ethyl, isopropyl, t-butyl, pentyl, heptyl, 1-ethyl pentyl, benzyl, 2-ethoxy ethyl, 1-carboxy methyl, and the like), an alkenyl group (preferably an alkenyl group having 2 to 20 carbon atoms, for example, vinyl, allyl, oleyl, and the like), an alkynyl group (preferably an alkynyl group having 2 to 20 carbon atoms, for example, ethynyl, butadiynyl, phenyl ethynyl, and the like), a cycloalkyl group (preferably a cycloalkyl group having 3 to 20 carbon atoms, for example, cyclopropyl, cyclopentyl, cyclohexyl, 4-methyl cyclohexyl, and the like), an aryl group (preferably an aryl group having 6 to 26 carbon atoms, for example, phenyl, 1-naphthyl, 4-methoxy phenyl, 2-chlorophenyl, 3-methyl phenyl, and the like), a heterocyclic group (preferably a heterocyclic group having 0 to 20 carbon atoms, an oxygen atom, a nitrogen atom, and a sulfur atom are preferable as a ring configuring hetero atom, a ring may be ring-condensed with a benzene ring or a hetero ring in a 5-membered ring or 6-membered ring, or a ring may be a saturated ring, an unsaturated ring, and an aromatic ring, for example, 2-pyridyl, 4-pyridyl. 2-imidazolyl, 2-benzimidazolyl, 2-thiazolyl, 2-oxazolyl, and the like), an alkoxy group (preferably an alkoxy group having 1 to 20 carbon atoms, for example, methoxy, ethoxy, isopropyl oxy, benzyl oxy, and the like), an aryl oxy group (preferably an aryl oxy group having 6 to 26 carbon atoms, for example, phenoxy, 1-naphthyl oxy, 3-methyl phenoxy, 4-methoxy phenoxy, and the like), an alkylthio group (preferably an alkylthio group having 1 to 20 carbon atoms, for example, methylthio, ethylthio, isopropylthio, benzylthio, and the like), an arylthio group (preferably an arylthio group having 6 to 26 carbon atoms, for example, phenylthio, 1-naphthylthio, 3-methyl phenylthio, 4-methoxy phenylthio, and the like), a sulfonyl group (preferably a sulfonyl group of alkyl or aryl, and preferably a sulfonyl group having 1 to 20 carbon atoms, for example, methyl sulfonyl, ethyl sulfonyl, benzene sulfonyl, toluene sulfonyl, and the like), an acyl group (including an alkyl carbonyl group, an alkenyl carbonyl group, an aryl carbonyl group, and a heterocyclic carbonyl group, and preferably an acyl group having carbon atoms of less than or equal to 20, for example, acetyl, pivaloyl, acryloyl, methacryloyl, benzoyl, nicotinoyl, and the like), an alkoxy carbonyl group (preferably an alkoxy carbonyl group having 2 to 20 carbon atoms, for example, ethoxy carbonyl, 2-ethyl hexyl oxy carbonyl, and the like), an aryl oxy carbonyl group (preferably an aryl oxy carbonyl group having 7 to 20 carbon atoms, for example, phenyl oxy carbonyl, naphthyl oxy carbonyl, and the like), an amino group (including an amino group, an alkyl amino group, an aryl amino group, and a heterocyclic amino group, preferably an amino group having 0 to 20 carbon atoms, for example, amino, N,N-dimethyl amino, N,N-diethyl amino, N-ethyl amino, anilino, 1-pyrrolidinyl, piperidino, morphonyl, and the like), a sulfone amide group (preferably a sulfone amide group of alkyl or aryl, and preferably a sulfone amide group having 0 to 20 carbon atoms, for example, N,N-dimethyl sulfone amide, N-phenyl sulfone amide, and the like), a sulfamoyl group (preferably a sulfamoyl group of alkyl or aryl, and preferably a sulfamoyl group having 0 to 20 carbon atoms, for example, N,N-dimethyl sulfamoyl, N-phenyl sulfamoyl, and the like), an acyl oxy group (preferably an acyl oxy group having 1 to 20 carbon atoms, for example, acetyl oxy, benzoyl oxy, and the like), a carbamoyl group (preferably a carbamoyl group of alkyl or aryl, and preferably a carbamoyl group having 1 to 20 carbon atoms, for example, N,N-dimethyl carbamoyl. N-phenyl carbamoyl, and the like), an acyl amino group (preferably an acyl amino group having 1 to 20 carbon atoms, for example, acetyl amino, acryloyl amino, benzoyl amino, nicotine amide, and the like), a cyano group, a hydroxy group, a mercapto group, or a halogen atom (for example, a fluorine atom, a chlorine atom, a bromine atom, an iodine atom, and the like).

The substituent groups described above may be further substituted with the substituent groups described above. For example, a perfluoroalkyl group such as trifluoromethyl, an aralkyl group, an alkyl group substituted with an acyl group, and the like are included.

Furthermore, these substituent groups include not only the substituent groups that each of the groups of $R^1$, $R^3$, $R^5$, and Ra may have but also L, and are also applied to substituent groups of other compounds disclosed herein.

An alkyl group, an alkenyl group, and an aryl group are preferable as the substituent groups that each of the groups of $R^1$ may have.

The alkyl group in $R^2$ and Ra has the same preferred range as that of the alkyl group in $R^1$, and the aryl group in $R^2$ has the same preferred range as that of the aryl group in $R^1$.

L represents a single bond or a bivalent or more connecting group, and a bivalent alkylene group, an arylene group, —O—, —S—, or a group of a combination thereof are preferable as a bivalent or more connecting group, examples of a trivalent group include an alkanetriyl group, an arenentriyl group, and —N<, and the bivalent connecting group described above may be combined with the trivalent group.

Examples of a tetravalent group include an alkanetetrayl group and an arenetetrayl group.

The bivalent or more connecting group in L may have a substituent group.

L is preferably a single bond, and a bivalent connecting group and a trivalent connecting group, is more preferably a single bond, an alkylene group, or an alkanetriyl group, and is even more preferably an alkylene group and an alkanetriyl group.

Here, in the alkylene group, the number of carbon atoms is preferably 1 to 6, is more preferably 1 to 4, is even more preferably 1 or 2, and is still more preferably 1. Specifically, examples of the alkylene group include an ethylene group, a propylene group, a trimethylene group, and a tetramethylene group.

When L is the alkylene group, $R^1$ is preferably an acyl group, an alkoxy carbonyl group, a carbamoyl group, an alkyl sulfonyl group, and an aryl sulfonyl group, and is more preferably an alkoxy carbonyl group and a carbamoyl group.

The alkanetriyl group also includes a methylidene group, examples of the alkanetriyl group include an ethane-1,2,2-triyl group, a propane-1,3,3-triyl group, and a butane-1,4- triyl group, and when L is the alkanetriyl group, $R^1$ is preferably a hydrogen atom or an alkyl group, and is more preferably a hydrogen atom.

When L is the single bond, $R^1$ is preferably an alkyl group, an alkenyl group, an aryl group, a heterocyclic group, an acyl group, an alkoxy carbonyl group, a carbamoyl group, an alkyl sulfonyl group, and an aryl sulfonyl group, and is more preferably an acyl group, an alkoxy carbonyl group, a carbamoyl group, an alkyl sulfonyl group, and an aryl sulfonyl group.

n represents 1 when L is the single bond, and n represents an integer of the valence of L−1 when L is the bivalent or more connecting group. That is, when L is bivalent, n is 1, and when L is trivalent, n is 2.

s and t are preferably 1 or 2, and are more preferably 1. In addition, it is preferable that both of s and t have the same integer.

X represents —O— or —N(Ra)-, and is preferably —O—.

$R^2$ is preferably an aryl group or an alkyl group which may be substituted with a cycloalkyl group, and is more preferably a group denoted by the following Formula (1) or (2).

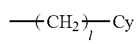

Formula (1)

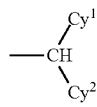

Formula (2)

In Formulas (1) and (2), l represents an integer of 1 to 5, and Cy, $Cy^1$, and $Cy^2$ each independently represent an aryl group or a cycloalkyl group.

l is preferably 1 to 4, is more preferably 1 to 3, is even more preferably 1 or 2, and is most preferably 1.

Cy, $Cy^1$, and $Cy^2$ are preferably a phenyl group or a cyclohexyl group, and a more preferably a phenyl group.

The compound denoted by Formula (I) preferably has 1 to 5 cyclic groups or cyclic partial structures, more preferably has 1 to 4 cyclic groups or cyclic partial structures, even more preferably has 2 to 4 cyclic groups or cyclic partial structures, and particularly preferably has 2 cyclic groups or cyclic partial structures, in the molecules. The cyclic group in the cyclic group or the cyclic partial structure is preferably an arene ring and a cycloalkyl ring, and is more preferably a benzene ring and a cyclohexane ring.

It is preferable that the compound denoted by Formula (I) is a compound denoted by the following Formula (II).

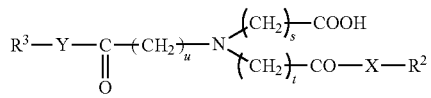

Formula (II)

In Formula (II), $R^2$, X, s, and t are identical to $R^2$, X, s, and t in Formula (I), and the preferred ranges of $R^2$, X, s, and t in Formula (II) are also identical to those of $R^2$, X, s, and t in Formula (I).

u represents 1, 2, or 3, and the preferred range is identical to those of s and t.

$R^3$ and $R^2$ are identical to each other, and the preferred ranges are also identical to each other. Y and X are identical to each other, and the preferred ranges are also identical to each other.

The molecular weight of the compound denoted by Formula (I) is preferably 250 to 800, and is more preferably 330 to 650.

In addition, pKa of the compound denoted by Formula (I) at 25° C. in a mixed solvent having a volume ratio of $THF/H_2O=6/4$ is preferably greater than 5.5, is more preferably greater than 5.5 and less than 7.0, and is even more preferably greater than 5.5 and less than 6.5.

Such a value is able to be obtained by adjusting an existence ratio of a carboxy group and an amino group in one molecule. By incorporating the compound denoted by Formula (I) in which pKa is adjusted in the optical film, a polarizer durability enhancement effect and a haze suppression effect become more excellent. Further, coloration of the cellulose acylate film under light irradiation is able to be suppressed or an adhesiveness enhancement effect at the time of disposing a hard coat layer or the like is able to be obtained. A specific mechanism is not clear, but the present inventors have considered that this is because a precursor of a carboxy group from which a carboxy group is generated is incorporated in aging.

Hereinafter, specific examples of the compound denoted by Formula (I) in the present invention will be shown, but the present invention is not limited thereto.

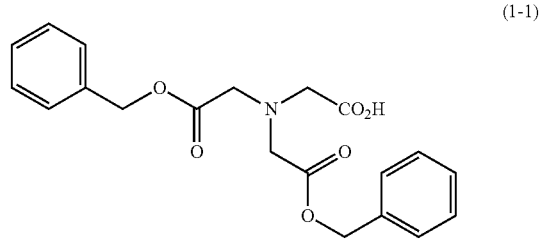

(1-1)

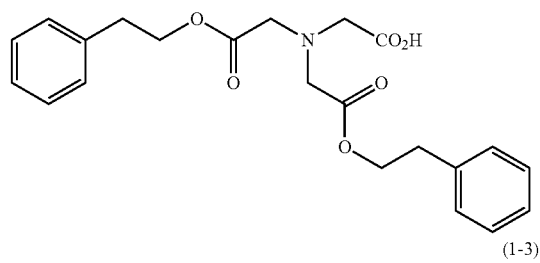

(1-2)

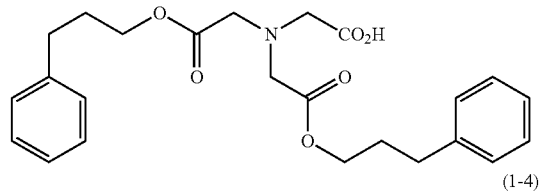

(1-3)

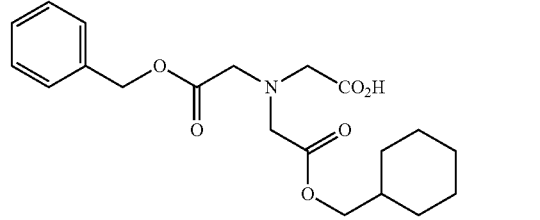

(1-4)

(1-5)
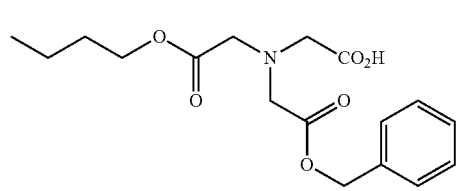
(1-6)
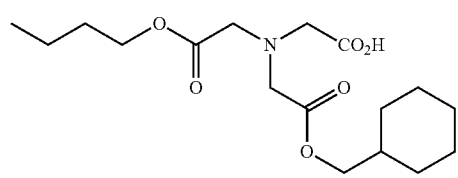
(1-7)
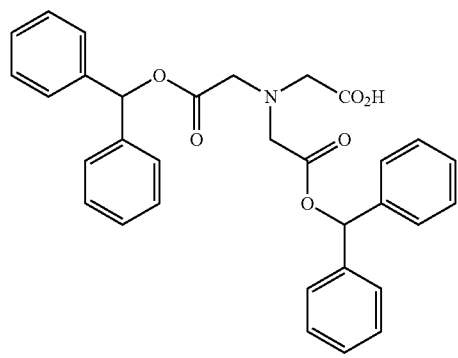
(2-1)
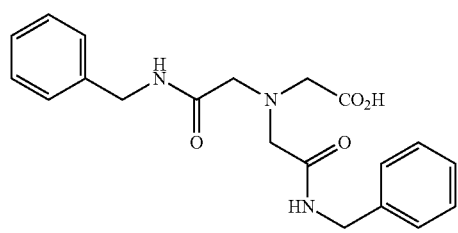
(2-2)
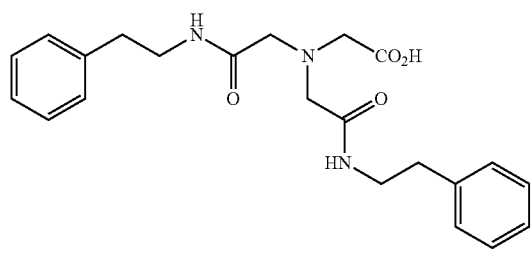
(2-3)
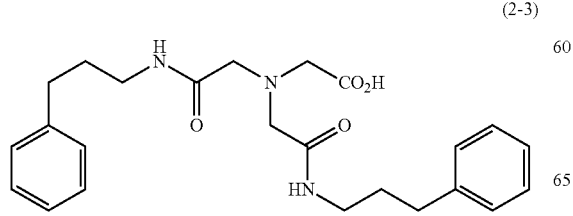
(2-4)
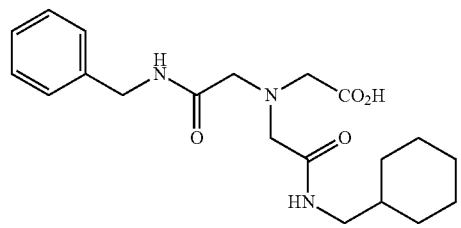
(2-5)
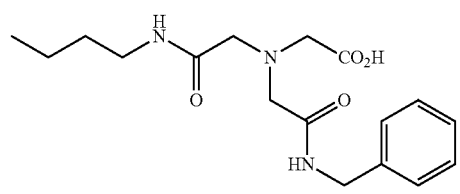
(2-6)
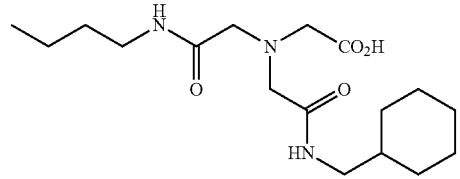
(2-7)
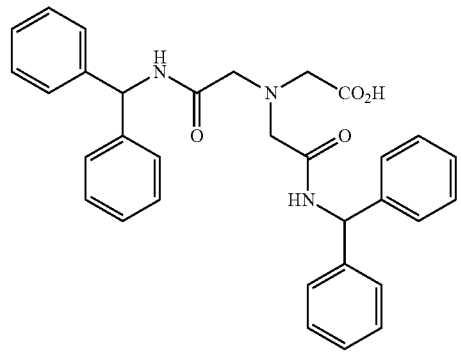
(3-1)
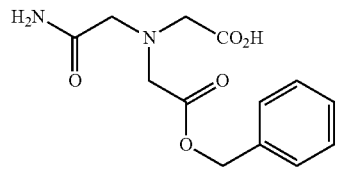
(3-2)
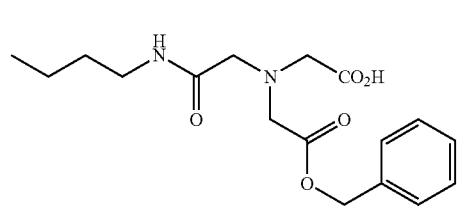
(3-3)
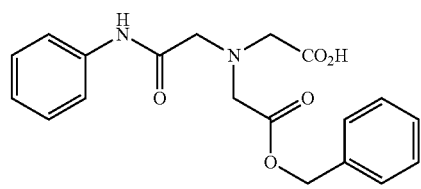

(3-4)
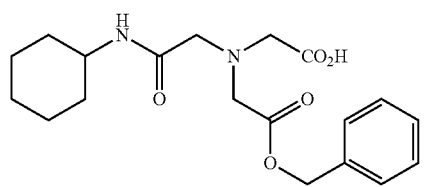
(3-5)
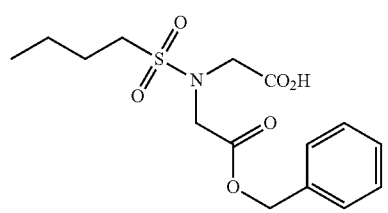
(3-6)
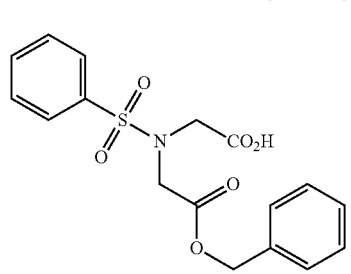
(3-7)
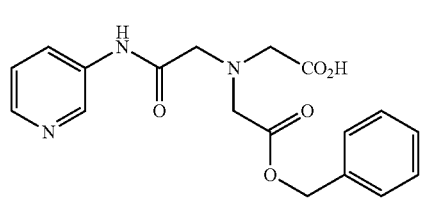
(3-8)
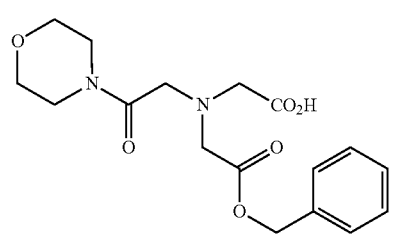
(3-9)
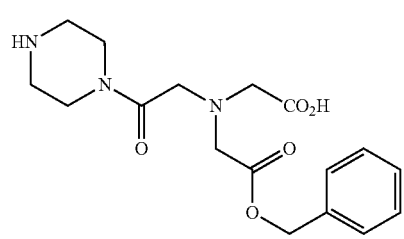
(4-1)
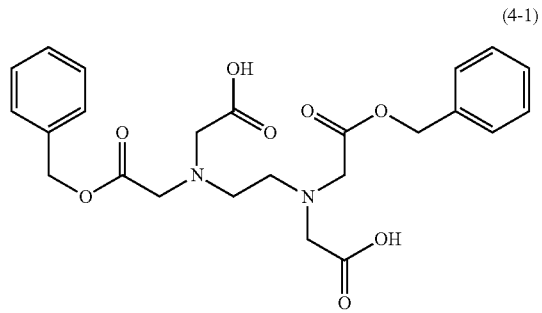
(4-2)
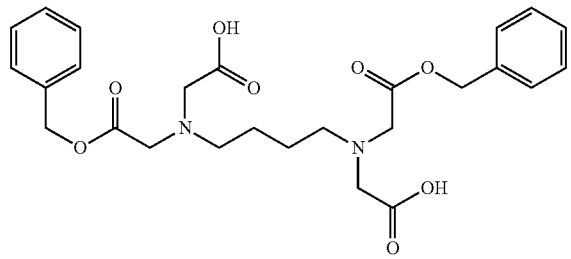
(4-3)
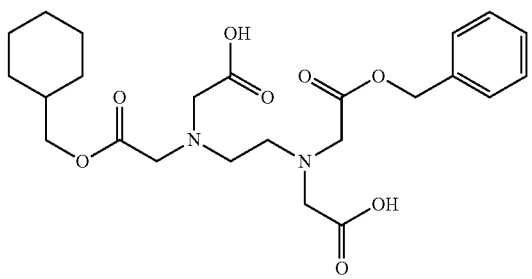
(4-4)
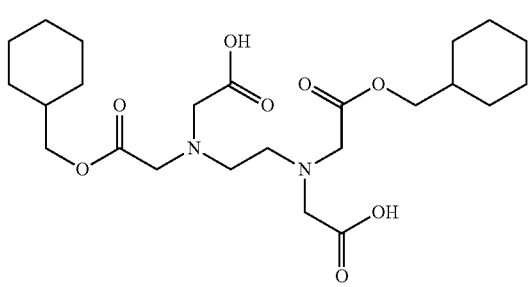
(4-5)
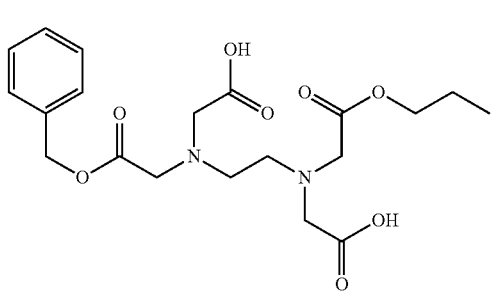
(4-6)
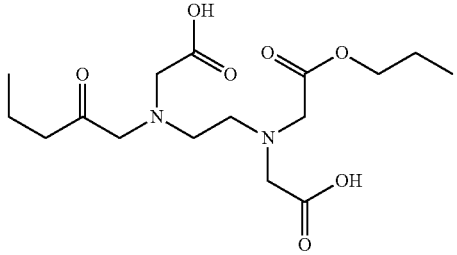

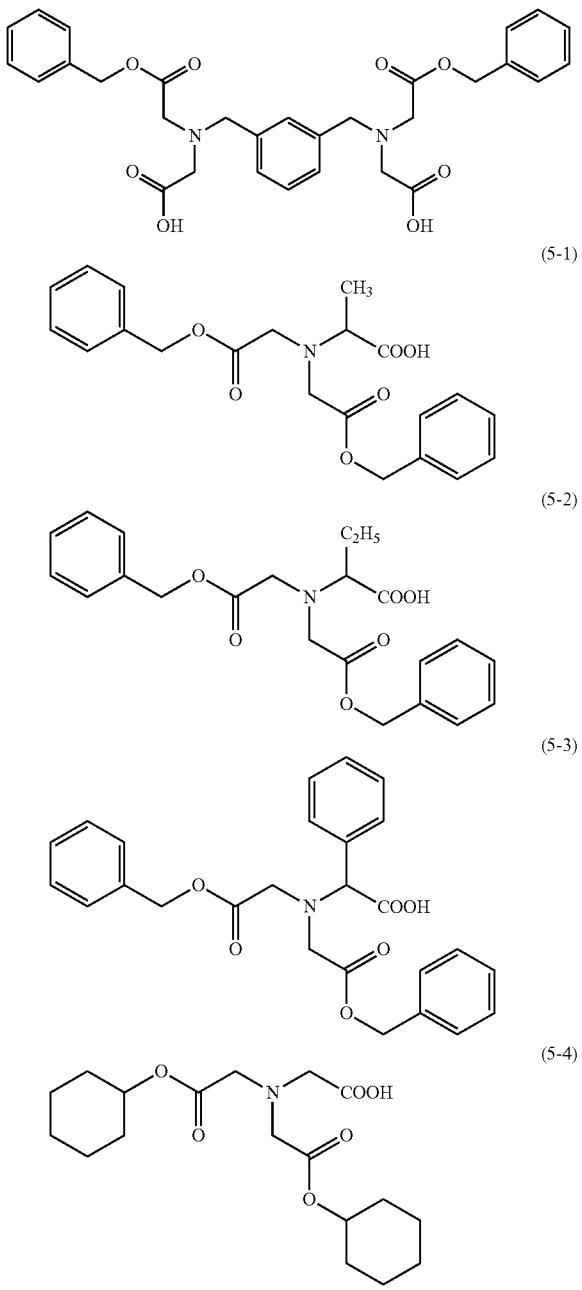

(4-7)
(5-1)
(5-2)
(5-3)
(5-4)

The compound denoted by Formula (I) in the present invention, for example, is able to be synthesized by a method through a monoester derivative.

The content of the compound denoted by Formula (I) in the optical film is not particularly limited, and is preferably 0.1 parts by mass to 20 parts by mass, is more preferably 0.5 parts by mass to 15 parts by mass, is even more preferably 0.5 parts by mass to 10 parts by mass, and is particularly preferably 1.0 part by mass to 5 parts by mass, with respect to 100 parts by mass of the cellulose acylate.

According to such a content, polarizer durability and a suppression effect of an increase in haze which are the effects of the present invention are sufficiently expressed.

In addition, even when two or more types of the compounds denoted by Formula (I) are contained in the optical film, it is preferable that the total amount is in the range described above.

<Cellulose Acylate>

In the present invention, one type of cellulose acylate which is a main component of the cellulose acylate film may be used, or two or more types thereof may be used. For example, the cellulose acylate may be cellulose acetate formed only of an acetyl group as an acyl substituent group, may be cellulose acylate having a plurality of different acyl substituent groups, or may be a mixture of different cellulose acylates.

Examples of cellulose which is a raw material of the cellulose acylate used in the present invention include cotton linter, wood pulp (broad leaf wood pulp and conifer wood pulp), and the like, cellulose obtained from any raw material cellulose is also able to be used, and according to a case, cellulose may be used by being mixed. For example, celluloses disclosed in Lecture of Plastic Materials (17) Cellulose-Based Resin (by MARUSAWA and UDA, The Nikkan Kogyo Shimbun, Ltd., Published in 1970) or Japan Institute of Invention and Innovation Disclosure 2001-1745 (Pages 7 to 8) are able to be used as the raw material cellulose.

In the present invention, the acyl group of the cellulose acylate may be only one type acyl group, or two or more types of acyl groups may be used. It is preferable that the cellulose acylate used in the present invention has an acyl group having carbon atoms of greater than or equal to 2 as a substituent group. The acyl group having carbon atoms of greater than or equal to 2 may be an aliphatic acyl group or an aromatic acyl group, but is not particularly limited. These acyl groups, for example, are an alkyl carbonyl group, an alkenyl carbonyl group or an aromatic carbonyl group, an aromatic alkyl carbonyl group, and the like of cellulose, and each further have a substituent group. Preferred examples of the acyl group include acetyl, propionyl, butanoyl, heptanoyl, hexanoyl, octanoyl, decanoyl, dodecanoyl, tridecanoyl, tetradecanoyl, hexadecanoyl, octadecanoyl, isobutanoyl, tert-butanoyl, cyclohexane carbonyl, oleoyl, benzoyl, naphthyl carbonyl, cinnamoyl, and the like. Among them, the acetyl, the propionyl, the butanoyl, the dodecanoyl, the octadecanoyl, the tert-butanoyl, the oleoyl, the benzoyl, the naphthyl carbonyl, the cinnamoyl, and the like are more preferable, the acetyl, the propionyl, and the butanoyl are even more preferable.

It is preferable that the cellulose acylate used in the present invention has an acyl group having 2 to 4 carbon atoms as a substituent group. When two or more types of acyl groups are used, it is preferable that, among them, one type of acyl group is an acetyl group, and it is preferable that the other acyl groups are a propionyl group or a butvryl group. By using such cellulose acylate, a solution having preferred solubility is able to be prepared, and in particular, in a non-chlorine-based organic solvent, an excellent solution is able to be prepared. Further, a solution having low viscosity and excellent filtration properties is able to be prepared.

In the present invention, in particular, it is preferable that the acyl group of the cellulose acylate is one type of acetyl group from a viewpoint of an excellent polarizer durability enhancement effect of the compound denoted by Formula (I).

The cellulose acylate preferably used in the present invention will be described in detail.

A β-1,4 bonding glucose unit configuring the cellulose has a free hydroxy group in a 2-position, in a 3-position, and in a 6-position. The cellulose acylate is a polymer in which a part of all of these hydroxy groups is acylated by the acyl group.

An degree of acyl substitution indicates a degree of acylation of the hydroxy group in the cellulose, which is positioned in the 2-position, in the 3-position, and in the 6-position, and when all of the hydroxy groups in the 2-position, in the 3-position, and in the 6-position in all glucose units are acylated, the total degree of acyl substitution is 3, and for example, when all of the hydroxy groups only in the 6-position are acylated in all of the glucose units, the total degree of acyl substitution is 1. Similarly, in all of the hydroxy groups in all of the glucose units, even when all of the hydroxy groups in any one of the 6-position and the 2-position are acylated in each of the glucose units, the total degree of acyl substitution is 1.

That is, the degree of acylation is denoted by a case where all of the hydroxy groups in glucose molecules are acylated to 3.

The details of a measurement method of the degree of acyl substitution are based on a method disclosed in Carbohydrate. Res. by TEZUKA et al. 273, 83-91 (1995) or a method defined in ASTM-D817-96.

The total degree of acyl substitution A of the cellulose acylate used in the present invention is preferably greater than or equal to 1.5 and less than or equal to 3.0 ($1.5 \leq A \leq 3.0$), is more preferably 2.00 to 2.97, is even more preferably greater than or equal to 2.50 and less than 2.97, and is particularly preferably 2.70 to 2.95.

In addition, in cellulose acetate using only the acetyl group as the acyl group of the cellulose acylate, the total degree of acetyl substitution B is preferably greater than or equal to 2.0 and less than or equal to 3 ($2.0 \leq B \leq 3.0$), is more preferably 2.0 to 2.97, is even more preferably greater than or equal to 2.5 and less than 2.97, and is still more preferably greater than or equal to 2.55 and less than 2.97, is particularly preferably 2.60 to 2.96, and is most preferably 2.70 to 2.95.

Furthermore, in the compound denoted by Formula (I) in the present invention, the effect is particularly expressed with respect to cellulose acylate in which the total degree of acetyl substitution B is greater than 2.50.

When the cellulose acylate film of the optical film of the present invention is a laminated body (a multi-layered configuration), in the cellulose acylate film, the degrees of acyl group substitution of cellulose acylates in each of the layers may homogeneous, or a plurality of cellulose acylates may be mixed in one layer.

In the acylation of cellulose, when an acid anhydride or an acid chloride is used as an acylation agent, methylene chloride or an organic acid such as an acetic acid is used as an organic solvent which is a reaction solvent.

When the acylation agent is the acid anhydride, a protonic catalyst such as a sulfuric acid is preferably used as a catalyst, and when the acylation agent is the acid chloride (for example, $CH_3CH_2COCl$), a basic compound is used as a catalyst.

An industrial synthesize method of mixed fatty acid ester which is the most general cellulose is a method in which cellulose is acylated by a fatty acid (an acetic acid, a propionic acid, a valeric acid, and the like) corresponding to an acetyl group and other acyl groups or a mixed organic acid component including acid anhydrides thereof.

The cellulose acylate, for example, is able to be synthesized by using a method disclosed in JP1998-45804A (JP-H10-45804A).

The film of the present invention, in particular, the cellulose acylate film used in the present invention, preferably contains the cellulose acylate in the amount of 5 mass % to 99 mass %, more preferably contains the cellulose acylate in the amount of 20 mass % to 99 mass %, and particularly preferably contains the cellulose acylate in the amount of 50 mass % to 95 mass %, in the total solid content, from a viewpoint of moisture permeability.

<Other Additives>

In the optical film of the present invention, in particular, in the cellulose acylate film, additives such as a retardation adjusting agent (a retardation expression agent and a retardation reduction agent), a plasticizer such as a polycondensed ester compound (a polymer), polyvalent ester of polyvalent alcohol, phthalic acid ester, and phosphoric acid ester, an ultraviolet absorbent, an antioxidant, and a matting agent are able to be added.

Furthermore, herein, a compound group is described, for example, by using "-based" such as a phosphoric acid ester-based compound. In this case, the "phosphoric acid ester-based compound" has the same meaning as that of a phosphoric acid ester compound.

(Retardation Reduction Agent)

In the present invention, a phosphoric acid ester-based compound or compounds other than a non-phosphoric acid ester-based compound which has been known as the additive of the cellulose acylate film are able to be widely adopted as the retardation reduction agent.

A high molecular retardation reduction agent is preferably a polymer selected from a phosphoric acid polyester-based polymer, a styrene-based polymer, an acrylic polymer, and a copolymer thereof, and is more preferably an acrylic polymer and a styrene-based polymer. In addition, it is preferable that at least one type of polymers having negative intrinsic birefringence such as the styrene-based polymer and the acrylic polymer is contained.

Examples of a low molecular weight retardation reduction agent which is the compound other than the non-phosphoric acid ester-based compound are able to include the following. The low molecular weight retardation reduction agent may be a solid or an oily substance. That is, the melting point or the boiling point thereof is not particularly limited. For example, ultraviolet absorbing materials having a melting point of lower than or equal to 20° C. and a melting point of higher than or equal to 20° C. are mixed, or similarly, deterioration preventive agents having a melting point of lower than or equal to 20° C. and a melting point of higher than or equal to 20° C. are mixed. Examples of an infrared absorbing dye are also able to include infrared absorbing dyes disclosed in JP2001-194522A.

As the time of adding the materials, the materials may be added in any preparing step of a cellulose acylate solution (dope). In addition, the addition of the materials may be performed by newly adding a step of adding and preparing the additive to the final preparing step of a dope preparing step.

In addition, the added amount of each of the materials is not particularly limited insofar as the function is expressed.

The low molecular weight retardation reduction agent which is the compound other than the non-phosphoric acid ester-based compound is not particularly limited, but the details thereof are disclosed in paragraphs 0066 to 0085 of JP2007-272177A.

A compound denoted by Formula (1) disclosed in paragraphs 0066 to 0085 of JP2007-272177A is able to be obtained by a condensation reaction between a sulfonyl chloride derivative and an amine derivative.

A compound denoted by Formula (2) disclosed in JP2007-272177A is able to be obtained by a dehydrative condensation reaction between carboxylic acids and amines using a condensation agent (for example, dicyclohexyl carbodiimide (DCC) and the like), a substitution reaction between a carboxylic acid chloride derivative and an amine derivative, and the like.

It is more preferable that the retardation reduction agent is an Rth reduction agent from a viewpoint of realizing a preferred Nz factor. Here, Rth indicates retardation of the cellulose acylate film in a film thickness direction. Among the retardation reduction agents, examples of the Rth reduction agent are able to include an acrylic polymer and a styrene-based polymer, low molecular compounds denoted by Formulas (3) to (7) disclosed in JP2007-272177A. Among them, the acrylic polymer and the styrene-based polymer are preferable, and the acrylic polymer is more preferable.

The retardation reduction agent is preferably added in a ratio of 0.01 mass % to 30 mass %, is more preferably added in a ratio of 0.1 mass % to 20 mass %, and is particularly preferably added in a ratio of 0.1 mass % to 10 mass %, with respect to a cellulose-based resin. By setting the added amount to be less than or equal to 30 mass %, it is possible to improve compatibility with respect to the cellulose-based resin, and it is possible to prepare a film having excellent transparency. When two or more types of retardation reduction agents are used, it is preferable that the total amount is in the range described above.

(Retardation Expression Agent)

In order to express a retardation value, the optical film of the present invention may contain at least one type of retardation expression agent.

The retardation expression agent is not particularly limited, and examples of the retardation expression agent include a retardation expression agent formed of a rod-like compound or a disk-like compound, or a compound exhibiting retardation expression properties among the non-phosphoric acid ester-based compounds. As the rod-like compound or the disk-like compound, a compound having at least two aromatic rings is able to be preferably used as the retardation expression agent.

The added amount of the retardation expression agent formed of the rod-like compound is preferably 0.1 parts by mass to 30 parts by mass, and is more preferably 0.5 parts by mass to 20 parts by mass, with respect to 100 parts by mass of a polymer component containing cellulose acylate.

The disk-like compound has more excellent Rth retardation expression properties than the rod-like compound, and thus when particularly large Rth retardation is required, the disk-like compound is preferably used. In addition, two or more types of retardation expression agents may be used together.

It is preferable that the retardation expression agent has the maximum absorption in a wavelength region of 250 nm to 400 nm, and it is preferable that the retardation expression agent does not substantially have absorption in a visible region.

The details of the retardation expression agent are disclosed in Page 49 of Journal of Technical Disclosure 2001-1745.

The added amount of the retardation expression agent formed of the disk-like compound is preferably 0.1 parts by mass to 30 parts by mass, and is more preferably 0.5 parts by mass to 20 parts by mass, with respect to 100 parts by mass of a polymer component containing cellulose acylate.

[Plasticizer (Hydrophobizing Agent)]

In the optical film, in particular, in the cellulose acylate film, when a plasticizer is contained in the cellulose acylate, moisture content or moisture permeability of the cellulose acylate film decreases, and a hydrolysis reaction of the cellulose acylate due to moisture in the cellulose acylate film is suppressed. Further, the plasticizer suppresses diffusion of the additives from the cellulose acylate film to a polarizer layer under high temperature and high humidity conditions, and thus it is possible to reduce deterioration of polarizer performance.

The compound denoted by Formula (I) in the present invention is contained in the optical film, in particular, in the cellulose acylate film, and thus is able to be used as the plasticizer. That is, a durability enhancement effect including control of a glass transition temperature and a reduction in the moisture content and the moisture permeability as described above is able to be obtained, and polarizer durability of the cellulose acylate film is also able to be high. Further, even when the compound denoted by Formula (I) in the present invention is used together with other general-purpose plasticizers, the polarizer durability improvement effect is able to be obtained. For this reason, a plurality of plasticizers may be contained together in the optical film and in the cellulose acylate film.

In the present invention, among the plasticizers used together, a multi-ester-based plasticizer is preferable in which ester groups are positionally close to each other and clogged with each other in molecules. Specifically, examples of the multi-ester-based plasticizer include a polycondensed ester compound (hereinafter, referred to as a polycondensed ester-based plasticizer), a polyvalent ester compound of polyvalent alcohol (hereinafter, referred to as a polyvalent alcohol ester-based plasticizer), and a carbohydrate compound (hereinafter, referred to as a carbohydrate derivative-based plasticizer), and in the present invention, these compounds are excellent for expressing the plasticizer effect as described above.

Hereinafter, the plasticizer used in the present invention will be described.

(Polycondensed Ester-Based Plasticizer)

The polycondensed ester-based plasticizer is obtained by polycondensing a bivalent carboxylic acid compound and a diol compound.

It is preferable that the polycondensed ester-based plasticizer is obtained by polycondensing at least one type of dicarboxylic acid denoted by the following Formula (a) and at least one type of diol denoted by the following Formula (b).

Formula (a)

Formula (b)

In Formulas (a) and (b), Xa represents a bivalent aliphatic group having 2 to 18 carbon atoms, a bivalent aromatic group having 6 to 18 carbon atoms, or a bivalent hetero ring having 2 to 18 carbon atoms, and Z represents a bivalent aliphatic group having 2 to 8 carbon atoms. Here, the bivalent aliphatic group having 2 to 8 carbon atoms may be a straight-chain bivalent aliphatic group or a branched bivalent aliphatic group.

Examples of the bivalent carboxylic acid compound denoted by Formula (a) include, as described above, an aliphatic carboxylic acid and an aromatic carboxylic acid or a heterocyclic carboxylic acid, and the aliphatic carboxylic acid or the aromatic carboxylic acid is preferable.

On the other hand, examples of the diol compound also include an aromatic compound or a heterocyclic compound in addition to the aliphatic compound denoted by Formula (b) described above.

Among them, a polycondensed ester-based plasticizer formed of at least one type of dicarboxylic acid having aromatic ring (also referred to as an aromatic dicarboxylic acid) and at least one type of aliphatic diol in which the average number of carbon atoms is 2.5 to 8.0 is preferable. In addition, a polycondensed ester-based plasticizer formed of a mixture of an aromatic dicarboxylic acid and at least one type of aliphatic dicarboxylic acid, and at least one type of aliphatic diol in which the average number of carbon atoms is 2.5 to 8.0 is also preferable.

The number average molecular weight of the polycondensed ester-based plasticizer is preferably 500 to 2000, is more preferably 600 to 1500, and is even more preferably 600 to 1200. When the number average molecular weight of polycondensed ester is greater than or equal to 600, volatility decreases, and a defect in film or step contamination due to volatilization under high temperature conditions at the time of stretching the cellulose acylate film is excellently suppressed.

In addition, when the number average molecular weight of the polycondensed ester is less than or equal to 2000, compatibility with respect to the cellulose acylate increases, and bleed out at the time of film formation and at the time of heating and stretching is excellently suppressed.

When a mixture of an aromatic dicarboxylic acid and an aliphatic dicarboxylic acid is used as a dicarboxylic acid component, the average number of carbon atoms in the dicarboxylic acid component is preferably 5.5 to 10.0, and is more preferably 5.6 to 8.0.

When the average number of carbon atoms is greater than or equal to 5.5, a polarizing plate having excellent durability is able to be obtained. When the average number of carbon atoms is less than or equal to 10, the compatibility with respect to the cellulose acylate becomes excellent, and bleed out during the film formation of the cellulose acylate film is excellently suppressed.

Examples of the aromatic dicarboxylic acid which is able to be used for synthesizing the polycondensed ester-based plasticizer are able to include a phthalic acid, a terephthalic acid, an isophthalic acid, a 1,5-naphthalene dicarboxylic acid, a 1,4-naphthalene dicarboxylic acid, a 1,8-naphthalene dicarboxylic acid, a 2,8-naphthalene dicarboxylic acid, a 2,6-naphthalene dicarboxylic acid, and the like. Among them, the phthalic acid, the terephthalic acid, and the 2,6-naphthalene dicarboxylic acid are preferable, the phthalic acid and the terephthalic acid are more preferable, and the terephthalic acid is even more preferable.

The polycondensed ester obtained from the diol compound and the dicarboxylic acid including the aliphatic dicarboxylic acid contains an aliphatic dicarboxylic acid residue.

Examples of the aliphatic dicarboxylic acid synthesizing the polycondensed ester-based plasticizer include an oxalic acid, a malonic acid, a succinic acid, a maleic acid, a fumaric acid, a glutaric acid, an adipic acid, a pimelic acid, a suberic acid, an azelaic acid, a sebacic acid, a dodecane dicarboxylic acid, a 1,2-cyclohexane dicarboxylic acid or a 1,4-cyclohexane dicarboxylic acid, and the like.

Examples of the diol synthesizing the polycondensed ester-based plasticizer include an aromatic diol and an aliphatic diol, and in the present invention, it is preferable that the polycondensed ester-based plasticizer is synthesized by using at least the aliphatic diol.

It is preferable that the polycondensed ester-based plasticizer contains an aliphatic diol residue in which the average number of carbon atoms is 2.5 to 7.0, and it is more preferable that the polycondensed ester-based plasticizer contains an aliphatic diol residue in which the average number of carbon atoms is 2.5 to 4.0.

When the average number of carbon atoms in the aliphatic diol residue is less than 7.0, the compatibility with respect to the cellulose acylate is enhanced, and the bleed out, an increase in heating loss of the compound, and a planar defect which is considered to be caused by the step contamination at the time of performing web drying with respect to the cellulose acylate are excellently suppressed. In addition, when the average number of carbon atoms in the aliphatic diol residue is greater than or equal to 2.5, the synthesis is easily performed.

Alkyl diols or alicyclic diols are preferable as the aliphatic diol used for synthesizing the polycondensed ester-based plasticizer, examples of the aliphatic diol include at least one type of ethylene glycol, 1,2-propane diol, and 1,3-propane diol, and at least one of the ethylene glycol and the 1,2-propane diol is particularly preferable.

The terminal of the polycondensed ester-based plasticizer may be left as diol or a carboxylic acid (that is, a polymer long-chain terminal is —OH or $CO_2H$) without being sealed, and may be subjected to so-called terminal sealing by allowing monocarboxylic acids or monoalcohols to react therewith. Furthermore, by sealing the terminal of the polycondensed ester-based plasticizer, it is possible to obtain a cellulose acylate film in which a state at a normal temperature is rarely turned into a solid state, handling properties become excellent, and humidity stability and polarizer durability are excellent.

Polycondensed ester-based plasticizers J-1 to J-38 disclosed in paragraphs 0062 to 0064 of JP2012-234159A are preferable as the polycondensed ester-based plasticizer.

(Polyvalent Alcohol Ester-Based Plasticizer)

The polyvalent alcohol ester-based plasticizer used in the present invention is an ester in which an alcohol portion is derived from polyvalent alcohol having two or more hydroxy groups, and alcohol where saturated hydrocarbon in which a portion other than the hydroxy group may be separated through an ether bond is substituted with two or more hydroxy groups is preferable as alcohol of the alcohol portion.

The polyvalent alcohol which is the raw material of the polyvalent alcohol ester-based plasticizer is denoted by the following Formula (c).

$$R\alpha\text{-(OH)}m \qquad \text{Formula (c)}$$

In Formula (c). $R\alpha$ represents an m-valent organic group, and m represents an integer of greater than or equal to 2.

The number of carbon atoms in the polyvalent alcohol is preferably greater than or equal to 5, and is more preferably 5 to 20.

Examples of such polyvalent alcohol include sugar alcohol or glycols.

Specifically, triethylene glycol, tetraethylene glycol, dipropylene glycol, tripropylene glycol, sorbitol, trimethylol propane, and xylitol are preferable.

An acid portion derived from a monocarboxylic acid is preferable as an acid portion of the polyvalent alcohol ester (an acyl portion of ester), and examples of such an acid include an aliphatic monocarboxylic acid, an alicyclic monocarboxylic acid, and an aromatic monocarboxylic acid. It is preferable that the alicyclic monocarboxylic acid and the aromatic monocarboxylic acid are used from a viewpoint of improving moisture permeability and retention properties.

The number of carbon atoms in the aliphatic monocarboxylic acid is preferably 1 to 32, is more preferably 1 to 20, and is particularly preferably 1 to 10. It is preferable that an acetic acid is contained from a viewpoint of increasing the compatibility with respect to the cellulose derivative, and it is also preferable that the acetic acid and other monocarboxylic acids are used by being mixed.

Preferred examples of the aliphatic monocarboxylic acid include a saturated fatty acid such as an acetic acid, a propionic acid, a butyric acid, a valeric acid, a caproic acid, an enanthic acid, a caprylic acid, a pelargonic acid, a capric acid, a 2-ethyl-hexane carboxylic acid, an undecylic acid, a lauric acid, a tridecylic acid, a myristic acid, a pentadecylic acid, a palmitic acid, a heptadecylic acid, a stearic acid, a nonadecanoic acid, an arachic acid, a behenic acid, a lignoceric acid, a cerotic acid, a heptacosanoic acid, a montanic acid, a melissic acid, and a lacceric acid, an unsaturated fatty acid such as an undecylenic acid, an oleic acid, a sorbic acid, a linoleic acid, a linolenic acid, and an arachidonic acid, and the like.

Preferred examples of the alicyclic monocarboxylic acid include a cyclopentane carboxylic acid, a cyclohexane carboxylic acid, a cyclooctane carboxylic acid, or a derivative thereof.

Preferred examples of the aromatic monocarboxylic acid include an aromatic monocarboxylic acid in which an alkyl group is introduced into a benzene ring of a benzoic acid, such as a benzoic acid and a toluic acid, biphenyl carboxylic acid, an aromatic monocarboxylic acid having two or more benzene rings, such as a naphthalene carboxylic acid and a tetralin carboxylic acid, or a derivative thereof, and the benzoic acid is particularly preferable.

The molecular weight of the polyvalent alcohol ester-based plasticizer is not particularly limited, but is preferably 300 to 3000, and is more preferably 350 to 1500. It is preferable that the polyvalent alcohol ester-based plasticizer has a large molecular weight from a viewpoint of excellently suppressing volatilization from the optical film, and it is preferable that the polyvalent alcohol ester-based plasticizer has a small molecular weight from a viewpoint of the moisture permeability and the compatibility with respect to the cellulose derivative.

For example, a compound disclosed in paragraphs 0045 to 0049 of JP2012-234159A is preferable as the polyvalent alcohol ester-based plasticizer, and is preferably incorporated herein as a part.

(Carbohydrate Derivative-Based Plasticizer)

Examples of the carbohydrate derivative-based plasticizer include derivatives of carbohydrate having monosaccharide or 2 to 10 monosaccharide units, and among them, acylated carbohydrate is preferable.

Examples of the carbohydrate having monosaccharide or 2 to 10 monosaccharide units preferably include ribose, arabinose, xylose, lyxose, glucose, fructose, mannose, galactose, trehalose, maltose, cellobiose, lactose, sucrose, sucralose, α-cyclodextrin, β-cyclodextrin, γ-cyclodextrin, δ-cyclodextrin, xylitol, and sorbitol, more preferably include the arabinose, the xylose, the glucose, the fructose, the mannose, the galactose, the maltose, the cellobiose, the sucrose, the β-cyclodextrin, and the γ-cyclodextrin, and particularly preferably include the xylose, the glucose, the fructose, the mannose, the galactose, the maltose, the cellobiose, the sucrose, the xylitol, and the sorbitol.

Particularly preferred examples of the carbohydrate derivative-based plasticizer include maltose octaacetate, cellobiose octaacetate, sucrose octaacetate, xylose tetrapropionate, glucose pentapropionate, fructose pentapropionate, mannose pentapropionate, galactose pentapropionate, maltose octapropionate, cellobiose octapropionate, sucrose octapropionate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitol pentabenzoate, sorbitol hexabenzoate, and the like.

A carbohydrate derivative-based plasticizer having a pyranose structure or a furanose structure is preferable as the carbohydrate derivative-based plasticizer.

A compound disclosed in paragraphs 0030 to 0039 of JP2012-234159A is preferable as the carbohydrate derivative-based plasticizer.

Furthermore, in the present invention, the contents disclosed in paragraphs 0026 to 0068 of JP2012-234159A are preferably applied to the plasticizer, and the contents disclosed in the paragraphs described above are preferably incorporated herein as a part.

The added amount of the plasticizer is preferably 1 mass % to 20 mass % with respect to the cellulose acylate. When the added amount of the plasticizer is greater than or equal to 1 mass %, a durability enhancement effect of a polarizer is easily obtained, and when the added amount of the plasticizer is less than or equal to 20 mass %, the bleed out hardly occurs. Further, the added amount is preferably 2 mass % to 15 mass %, and is particularly preferably 5 mass % to 15 mass %. Furthermore, two or more types of plasticizers may be added. Even when two or more types of plasticizers are added, a specific example and a preferred range of the added amount are identical to those described above.

A timing of adding the plasticizer to the cellulose acylate film is not particularly limited insofar as the plasticizer is added at the time of forming the film. For example, the plasticizer may be added at the time of synthesizing the cellulose acylate, or the plasticizer may be mixed with the cellulose acylate at the time of preparing a dope.

(Antioxidant)

It is preferable that the optical film of the present invention contains an antioxidant. The antioxidant is able to be added to the cellulose acylate solution. In the present invention, a known antioxidant, for example, a phenol-based antioxidant or a hydroquinone-based antioxidant such as 2,6-di-tert-butyl-4-methyl phenol, 4,4'-thiobis-(6-tert-butyl-3-methyl phenol), 1,1'-bis(4-hydroxy phenyl) cyclohexane, 2,2'-methylene bis(4-ethyl-6-tert-butyl phenol), 2,5-di-tert-butyl hydroquinone, and pentaerythrityl-tetrakis[3-(3,5-di-tert-butyl-4-hydroxy phenyl) propionate] is able to be added. Further, it is preferable that a phosphorus-based antioxidant such as tris(4-methoxy-3,5-diphenyl) phosphite, tris(nonyl phenyl) phosphite, tris(2,4-di-tert-butyl phenyl) phosphite, bis(2,6-di-tert-butyl-4-methyl phenyl) pentaerythritol diphosphite, and bis(2,4-di-tert-butyl phenyl) pentaerythritol diphosphite is used.

The added amount of the antioxidant is preferably 0.05 parts by mass to 5.0 parts by mass with respect to 100 parts by mass of the cellulose acylate.

(Ultraviolet Absorbent)

The optical film of the present invention may contain an ultraviolet absorbent from a viewpoint of preventing deterioration of a polarizing plate, a liquid crystal, and the like. The ultraviolet absorbent is able to be added to the cellulose acylate solution. In the present invention, an ultraviolet absorbent having low absorbancy in visible light having a wavelength of greater than or equal to 400 nm is preferably used as the ultraviolet absorbent from a viewpoint of excellent absorption capacity in ultraviolet light having a wavelength of less than or equal to 370 nm and excellent liquid crystal display properties. Examples of the ultraviolet absorbent preferably used in the present invention include a hindered phenol-based compound, a hydroxy benzophenone-based compound, a benzotriazole-based compound, a salicylic acid ester-based compound, a benzophenone-based compound, a cyanoacrylate-based compound, a nickel complex salt-based compound, and the like.

Examples of the hindered phenol-based compound include 2,6-di-tert-butyl-p-cresol, pentaerythrityl-tetrakis[3-(3,5-di-tert-butyl-4-hydroxy phenyl) propionate], N,N'-hexamethylene bis(3,5-di-tert-butyl-4-hydroxy-hydrocinnamide), 1,3,5-trimethyl-2,4,6-tris(3,5-di-tert-butyl-4-hydroxy benzyl) benzene, tris-(3,5-di-tert-butyl-4-hydroxy benzyl)-isocyanurate, and the like.

Examples of the benzotriazole-based compound include 2-(2'-hydroxy-5'-methyl phenyl) benzotriazole, 2,2-methylene bis[4-(1,1,3,3-tetramethyl butyl)-6-(2H-benzotriazol-2-yl) phenol], (2,4-bis-(n-octylthio)-6-(4-hydroxy-3,5-di-tert-butyl anilino)-1,3,5-triazine, triethylene glycol-bis[3-(3-tert-butyl-5-methyl-4-hydroxy phenyl) propionate], N,N'-hexamethylene bis(3,5-di-tert-butyl-4-hydroxy-hydrocinnamide), 1,3,5-trimethyl-2,4,6-tris(3,5-di-tert-butyl-4-hydroxy benzyl) benzene, 2-(2'-hydroxy-3',5'-di-tert-butyl phenyl)-5-chlorobenzotriazole, 2-(2'-hydroxy-3',5'-di-tert-amyl phenyl)-5-chlorobenzotriazole, 2,6-di-tert-butyl-p-cresol, pentaerythrityl-tetrakis[3-(3,5-di-tert-butyl-4-hydroxy phenyl) propionate], and the like.

The added amount of the ultraviolet absorbent is preferably 1 to 1.0% in a mass ratio in the total solid content of the cellulose acylate film, and is further preferably 10 ppm to 1000 ppm.

(Matting Agent)

The optical film of the present invention may further contain a matting agent from a viewpoint of film slipperiness and stable manufacturing. The matting agent may be a matting agent of an inorganic compound, or may be a matting agent of an organic compound.

An inorganic compound containing silicon (for example, silicon dioxide, calcined calcium silicate, hydrated calcium silicate, aluminum silicate, magnesium silicate, and the like), titanium oxide, zinc oxide, aluminum oxide, barium oxide, zirconium oxide, strontium oxide, antimony oxide, tin oxide, tin-antimony oxide, calcium carbonate, talc, clay, calcined kaolin, calcium phosphate, and the like are preferable as the matting agent of the inorganic compound, and the inorganic compound containing silicon or the zirconium oxide is more preferable. Among them, the silicon dioxide is particularly preferable from a viewpoint of capable of reducing turbidity of the cellulose acylate film.

For example, commercial products with product names such as Aerosil R972, Aerosil R974, Aerosil R812, Aerosil 200, Aerosil 300, Aerosil R202, Aerosil OX50, and Aerosil TT600 (all are manufactured by Nippon Aerosil Co., Ltd.) are able to be used as fine particles of the silicon dioxide, and for example, commercially available products with product names such as Aerosil R976 and Aerosil R811 (all are manufactured by Nippon Aerosil Co., Ltd.) are able to be used as the fine particles of the zirconium oxide.

For example, a polymer such as a silicone resin, a fluorine resin, and an acrylic resin is preferable as the matting agent of the organic compound, and among them, the silicone resin is preferable. Among the silicone resins, a silicone resin having a three-dimensional mesh-like structure is particularly preferable, and for example, commercially available products with product names such as Tospearl 103, Tospearl 105, Tospearl 108, Tospearl 120, Tospearl 145, Tospearl 3120, and Tospearl 240 (all are manufactured by GE Toshiba Silicones Co., Ltd.) are able to be used.

When such a matting agent is added to the cellulose acylate solution, a method of adding the matting agent is not particularly limited insofar as a desired cellulose acylate solution is able to be obtained by using any method. For example, the additive may be contained in a step of mixing the cellulose acylate and a solvent, or the additive may be added after preparing a mixed solution of the cellulose acylate and a solvent.

Further, the additive may be added and mixed immediately before casting a dope (a so-called adding immediately before casting method). The mixing in the adding immediately before casting method is performed by disposing screw type kneaders online. Specifically, a static mixer such as an inline mixer is preferable, and a static mixer SWJ (a Toray static in-tube mixer Hi-Mixer) (manufactured by Toray Engineering Co., Ltd.) is preferable as the inline mixer.

Furthermore, in order to eliminate concentration unevenness, aggregation of particles, and the like in the inline adding, a manufacturing method of a cellulose acylate film is disclosed in JP2003-053752A in which a distance L between an adding nozzle tip end mixing a dope of a main raw material with an additive liquid having a different composition and a starting end of an inline mixer is set to be less than or equal to 5 times an inner diameter d of a tube for a main raw material, and thus concentration unevenness, aggregation of matting particles, and the like are eliminated. A more preferred aspect is disclosed in which a distance (L) between a tip opening portion of a supply nozzle for an additive liquid having a composition different from that of a dope of a main raw material and a starting end of an inline mixer is set to be less than or equal to 10 times an inner diameter (d) of the tip opening portion of the supply nozzle, and an inline mixer is a static non-stirring type in-tube mixer or a dynamic stirring type in-tube mixer. Specifically, it is disclosed that a flow ratio of a dope of a main raw material of a cellulose acylate film/an inline additive liquid is 10/1 to 500/1, and is preferably 50/1 to 200/1.

Further, a method of adding an additive is disclosed in JP2003-014933A of which an object is to provide a retardation film in which bleed out of the additive is reduced, a peeling phenomenon between layers is eliminated, and slipperiness and transparency are excellent. According to this, it is disclosed that the additive may be added into a dissolving vessel, or the additive or a solution in which the additives are dissolved or dispersed may be added into the dope during liquid feeding between the dissolving vessel and a cocasting die, and in the latter case, it is preferable that mixing means such as a static mixer is disposed in order to increase mixing properties.

It is particularly preferable that the matting agent is contained in the film in the ratio of 0.05 mass % to 1.0 mass %. According to such a range, when haze of the cellulose acylate film does not increase, and the cellulose acylate film is actually used in a liquid crystal display (LCD), problems such as a decrease in contrast, the occurrence of a bright spot, and the like are suppressed. In addition, it is possible to realize scratch resistance. From such a viewpoint, it is particularly preferable that the matting agent is contained in the cellulose acylate film in the ratio of 0.05 mass % to 1.0 mass %.

<Physical Properties of Cellulose Acylate Film>

[Modulus of Elasticity (Modulus of Tension Elasticity)]

It is preferable that the cellulose acylate film exhibits practically sufficient modulus of elasticity (modulus of tension elasticity). The range of the modulus of elasticity is not particularly limited. However, the range of the modulus of elasticity is preferably 1.0 GPa to 7.0 GPa, and is more preferably 2.0 GPa to 6.5 GPa from a viewpoint of manufacturing suitability and handling properties. The compound denoted by Formula (I) in the present invention is added into the cellulose acylate film, and thus the cellulose acylate film is hydrophobized and the modulus of elasticity is improved, and these properties are advantages of the present invention.

(Photoelastic Coefficient)

The absolute value of a photoelastic coefficient of the cellulose acylate film is preferably less than or equal to $8.0 \times 10^{-12}$ m$^2$/N, is more preferably less than or equal to $6 \times 10^{-12}$ m$^2$/N, and is even more preferably less than or equal to $5 \times 10^{-12}$ m$^2$/N. The photoelastic coefficient of the cellulose acylate film decreases, and thus when the optical film of the present invention including the cellulose acylate film is incorporated in a liquid crystal display device as a polarizing plate protective film, it is possible to suppress the occurrence of unevenness under high temperature and high humidity. The photoelastic coefficient, unless otherwise specifically stated, is calculated by being measured according to the following methods.

The lower limit value of modulus of photoelasticity is not particularly limited, and it is practical that the lower limit value of modulus of photoelasticity is greater than or equal to $0.1 \times 10^{-12}$ m$^2$/N.

The cellulose acylate film is cut to have a size of 3.5 cm×12 cm, and the photoelastic coefficient is measured by being calculated from a slope of a straight line of a change in retardation corresponding to a stress by measuring in-plane retardation (Re) with an ellipsometer (M150[product name], manufactured by Jasco Corporation) at each load of no load, 250 g, 500 g, 1000 g, and 1500 g.

(Moisture Content)

The moisture content of the cellulose acylate film is able to be evaluated by measuring an equilibrium moisture content at constant temperature and humidity. The equilibrium moisture content is calculated by measuring the moisture amount of a sample which reaches equilibrium after being placed for 24 hours at the constant temperature and humidity described above using a Karl Fischer method, and by dividing a moisture amount (g) by a sample mass (g).

The moisture content of the cellulose acylate film at a temperature of 25° C. and relative humidity of 80% is preferably less than or equal to 5 mass %, is more preferably less than or equal to 4 mass %, and is even more preferably less than 3 mass %. The moisture content of the cellulose acylate film decreases, and thus when the optical film of the present invention including the cellulose acylate film is incorporated in the liquid crystal display device as the polarizing plate protective film, it is possible to suppress the occurrence of display unevenness of the liquid crystal display device under high temperature and high humidity. The lower limit value of the moisture content is not particularly limited, but it is practical that the lower limit value of the moisture content is greater than or equal to 0.1 mass %.

(Moisture Permeability)

The moisture permeability of the cellulose acylate film is able to be evaluated by measuring the mass of water vapor per 24 hours passing through the sample in an atmosphere of a temperature of 40° C. and relative humidity of 90% RH on the basis of a moisture permeability test (a cup method) of JIS Z0208, and by converting the mass of the water vapor per 24 hours into the mass of the water vapor passing through for 24 hours per a sample area of 1 m$^2$.

The moisture permeability of the cellulose acylate film is preferably 500 g/m$^2$·day to 2000 g/m$^2$·day, is more preferably 900 g/m$^2$·day to 1300 g/m$^2$·day, and is particularly preferably 1000 g/m$^2$·day to 1200 g/m$^2$·day.

(Haze)

The haze of the cellulose acylate film is preferably less than or equal to 1%, is more preferably less than or equal to 0.7%, and is particularly preferably less than or equal to 0.5%.

By setting the haze to be less than or equal to the upper limit value described above, advantages such as a further increase in transparency of the cellulose acylate film and ease of use as an optical film are obtained. The haze, unless otherwise specifically stated, is calculated by being measured according to the following methods. The lower limit value of the haze is not particularly limited, but it is practical that the lower limit value of the haze is greater than or equal to 0.001%.

A cellulose acylate film of 40 mm×80 mm is measured under an environment of a temperature of 25° C. and relative humidity of 60% by using a hazemeter (HGM-2DP, manufactured by Suga Test Instruments Co. Ltd.) according to JIS K7136.

(Film Thickness)

The average film thickness of the cellulose acylate film is preferably 10 µm to 100 µm, is more preferably 15 µm to 80 µm, and is even more preferably 15 µm to 70 µm. By setting the average film thickness of the cellulose acylate film to be greater than or equal to 15 µm, handling properties at the time of preparing a web-like film are improved, and thus setting the average film thickness of the cellulose acylate film to be greater than or equal to 15 µm is preferable. In addition, by setting the average film thickness of the cellulose acylate film to be less than or equal to 70 µm, it is easy to deal with a humidity change, and it is easy to maintain optical properties.

When the cellulose acylate film has a laminated structure of three or more layers, the film thickness of the core layer is preferably 3 µm to 70 µm, and is more preferably 5 µm to 60 µm, and the film thickness of the skin layer A and the skin layer B is preferably 0.5 µm to 20 µm, is particularly preferably 0.5 µm to 10 µm, and is most preferably 0.5 µm to 3 µm.

(Width)

The width of the cellulose acylate film is preferably 700 mm to 3000 mm, is more preferably 1000 mm to 2800 mm, and is particularly preferably 1300 mm to 2500 mm.

<Manufacturing Method of Cellulose Acylate Film>

A manufacturing method of the cellulose acylate film of the present invention is not particularly limited, but it is preferable that the cellulose acylate film of the present invention is manufactured by using a melt casting method or a solvent casting method. It is more preferable that the cellulose acylate film of the present invention is manufactured by using the solvent casting method. A manufacturing example of the cellulose acylate film using the solvent cast method is able to refer to the specification of each of U.S. Pat. No. 2,336,310B, U.S. Pat. No. 2,367,603B, U.S. Pat. No. 2,492,078B, U.S. Pat. No. 2,492,977B, U.S. Pat. No. 2,492,978B, U.S. Pat. No. 2,607,704B, U.S. Pat. No. 2,739,069B, and U.S. Pat. No. 2,739,070B, the specification of each of GB640731B and GB736892B, and the publication of each of JP1970-4554B (JP-S45-4554B), JP1974-5614B (JP-S49-5614B), JP1985-176834A (JP-S60-176834A), JP1985-203430A (JP-S60-203430A), JP-1987-115035A (JP-S62-115035A), and the like. In addition, the cellulose acylate film may be subjected to a stretching treatment. A method and conditions of the stretching treatment, for example, is able to refer to the publication of each of JP1987-115035A (JP-S62-115035A), JP1992-152125A (JP-H04-152125A), JP1992-284211A (JP-H04-284211A), JP1992-298310A (JP-H04-298310A), JP1999-48271A (JP-H11-48271A), and the like.

(Casting Method)

Examples of the solution casting method include a pressure die method in which a prepared dope is homogeneously extruded onto a metal support body from a pressure die, a doctor blade method in which the film thickness of a dope which has been casted on a metal support body is adjusted first by using a blade, a reverse roll coater method in which the film thickness is adjusted by using a reversely rotating roll, and the like, and the pressure die method is preferable. A coat hanger type die, a T die type die, or the like is used as the pressure die, and all of the dies are able to be preferably used. In addition, the cellulose acylate solution is able to be casted by using various methods which have been known from the related art in which a cellulose acylate solution is casted and a film is formed in addition to the methods described herein, and each condition is set in consideration of a difference in a boiling point of a solvent to be used, or the like, and thus the same effect as that in the contents of each of the publications is able to be obtained.

Cocasting

In the formation of the cellulose acylate film, a lamination casting method such as a cocasting method, a sequentially casting method, and a coating method is preferably used, and a cocasting method is particularly preferably used from a viewpoint of stable manufacturing and a reduction in production costs.

When the cellulose acylate film is manufactured by using the cocasting method and the sequentially casting method, first, the cellulose acetate solution (the dope) for each layer is prepared. The cocasting method (multi-layer concurrently casting) is a casting method in which the dope is extruded from a die for casting concurrently extruding each dope for casting of each of the layers (three layers or three or more layers may be used) from a separate slit or the like onto a support body for casting (a band or a drum), the respective layers are concurrently casted, are peeled off from the support body at a suitable timing, and are dried, and thus a film is molded.

The sequentially casting method is a casting method in which, first, a dope for casting of a first layer is extruded from the die for casting onto the support body for casting, is casted, and is dried or is not dried, and a dope for casting of a second layer is extruded from the die for casting and is casted thereonto. Here, as necessary, dopes for third or more layers are sequentially casted and laminated. After that, the dopes are peeled off from the support body at a suitable timing and are dried, and thus a cellulose acylate film is molded. In general, the coating method is a method in which a core layer is molded into the shape of a film by using a solvent casting method, a coating liquid applied onto a surface layer is prepared, the coating liquid is applied onto each one surface or is concurrently applied onto both surfaces of the core layer and is dried by using a suitable coating machine, and thus a cellulose acylate film having a laminated structure is molded.

A drum of which the surface is subjected to mirror finishing by chromium plating or a stainless steel belt (may be a band) which is subjected to mirror finishing by surface grinding is used as a metal support body endlessly traveling which is used for manufacturing the cellulose acylate film. One or two or more pressure dies to be used may be disposed in the upper portion of the metal support body. The number of pressure dies is preferably 1 or 2.

When two or more pressure dies are disposed, a doping amount to be casted may be divided into each of the dies at various ratios, or a dope may be fed into each of the dies from a plurality of precise quantitative gear pumps at each of the ratios. The temperature of the dope (a resin solution) used in the casting is preferably −10° C. to 55° C., and is more preferably 25° C. to 50° C. In this case, the solution temperature may be identical in all of steps, or may be different in each of the steps. When the solution temperatures are different, a desired temperature may be set immediately before the casting.

In addition, the material of the metal support body described above is not particularly limited, and SUS (for example, SUS316) is preferable.

(Peeling)

It is preferable that the manufacturing method of the cellulose acylate film includes a step in which the doped film described above is peeled from the metal support body. A peeling method in the manufacturing method of the cellulose acylate film is not particularly limited, and when a known method is used, it is possible to enhance peelability.

(Stretching Treatment)

It is preferable that the manufacturing method of the cellulose acylate film includes a step in which the film is stretched after being formed. It is preferable that a stretching direction of the cellulose acylate film is either a cellulose acylate film transport direction (an MD direction) or a direction orthogonal to the transport direction (a TD direction), and it is particularly preferable that the cellulose acylate film is stretched in the direction orthogonal to the cellulose acylate film transport direction (the TD direction) from a viewpoint of a machining process of a polarizing plate using the cellulose acylate film, which follows after the stretching.

A method of stretching the film in the TD direction, for example, is disclosed in each of JP1987-115035A (JP-S62-115035A), JP1992-152125A (JP-H04-152125A), JP1992-284211A (JP-H04-284211A), JP1992-298310A (JP-H04-298310A), JP1999-48271A (JP-H11-48271A), and the like. When the film is stretched in the MD direction, for example, the speed of a transport roller of the cellulose acylate film is adjusted, and the winding speed of the cellulose acylate film is faster than the peeling speed of the cellulose acylate film, and thus the cellulose acylate film is stretched. When the film is stretched in the TD direction, the cellulose acylate film is able to be stretched also by transporting the cellulose acylate film while holding the width of the cellulose acylate film with a tenter, and by gradually widening the width of the tenter. It is also possible to stretch the cellulose acylate film by using a stretching machine (preferably monoaxial stretching using a long stretching machine) after drying the cellulose acylate film.

When the cellulose acylate film is used as a protective film of a polarizer, a light leakage is suppressed when a polarizing plate is obliquely viewed, and thus it is necessary that a transmission axis of the polarizer and an in-plane slow axis of the cellulose acylate film are arranged to be parallel to each other. In general, a transmission axis of a roll film-like polarizer which is continuously manufactured is parallel to a width direction of the roll film. For this reason, in order to continuously bond the protective film which is formed of the roll film-like polarizer described above and a roll film-like cellulose acylate film, it is necessary that an in-plane slow axis of the roll film-like protective film is parallel to a width direction of the cellulose acylate film. Accordingly, it is preferable that further stretching is performed in the TD direction. In addition, the stretching treatment may be performed during a film forming step, or a raw fabric which is formed and is wound may be subjected to the stretching treatment.

The stretching in the TD direction is preferably stretching of 5% to 100%, is more preferably stretching of 5% to 80%, and is particularly preferably stretching of 5% to 40%. Furthermore, unstretching indicates that the stretching is 0%. The stretching treatment may be performed during the film forming step, or a raw fabric which is formed and is wound may be subjected to the stretching treatment. In the former case, the stretching may be performed in a state of including a residual solvent. Here, the stretching is able to be preferably performed when Amount of Residual Solvent= (Residual Volatile Component Mass/Film Mass after Heating Treatment)×100% is 0.05% to 50%. It is particularly preferable that stretching of 5% to 80% is performed in a state where the amount of residual solvent is 0.05% to 5%.

(Drying)

It is preferable that a step of drying the cellulose acylate film and a step of stretching the cellulose acylate film after being dried at a temperature of higher than or equal to a glass transition temperature (Tg)—10° C. are included in the manufacturing method of the cellulose acylate film from a viewpoint of retardation expression properties.

In the manufacturing of the cellulose acylate film, the dope on the metal support body is dried, in general, by using a method of applying hot air from the surface side of the metal support body (the drum or the belt), that is, from the surface of the web on the metal support body, a method of applying hot air from the back surface of the drum or the belt, a back surface liquid heat transmitting method in which a temperature controlled liquid is in contact with the back surface of the belt or the drum on a side opposite to the surface on which the dope is casted, the drum or the belt is heated by heat transmission, and the surface temperature is controlled, and the like, and in the present invention, the back surface liquid heat transmitting method is preferable. The surface temperature of the metal support body before being casted is not limited insofar as the surface temperature of the metal support body is lower than or equal to the boiling point of the solvent which is used in the dope. However, in order to accelerate the drying and in order to eliminate fluidity on the metal support body, it is preferable that the surface temperature in the solvent to be used is set to a temperature 1° C. to 10° C. lower than the boiling point of the solvent having the lowest boiling point. However, when the casted dope is peeled off without being cooled and dried, the surface temperature of the metal support body is not limited thereto.

The thickness of the cellulose acylate film may be adjusted to have a desired thickness by adjusting the concentration of solid contents contained in the dope, a slit gap of a base in the die, an extrusion pressure from the die, the speed of the metal support body, and the like.

On the other hand, the length of the cellulose acylate film is preferably wound in 100 m to 10000 m per one roll, is more preferably wound in 500 m to 7000 m, and is even more preferably wound in 1000 m to 6000 m. At the time of winding the cellulose acylate film, it is preferable that a knurling is applied to at least one end. The width of the knurling is preferably 3 mm to 50 mm, and is more preferably 5 mm to 30 mm, and the height of the knurling is preferably 0.5 μm to 500 μm, and is more preferably 1 μm to 200 μmin. The cellulose acylate film may be pressed on one side, or may be pressed on both sides.

When the optical film of the present invention is used as an optical compensation film for a large-screen liquid crystal display device, for example, it is preferable that the film is molded such that the width thereof is greater than or equal to 1470 mm. In addition, the polarizing plate protective film of the present invention include not only a film having an aspect of a film piece which is cut to have a size capable of being directly incorporated in a liquid crystal display device, but also a film having an aspect in which the film is prepared in the shape of a long film by continuous production, and is wound into the shape of a roll. The polarizing plate protective film having the latter aspect is kept and transported in this state, and is used by being cut to have a desired size when the polarizing plate protective film is practically incorporated in the liquid crystal display device or when the polarizing plate protective film is bonded to the polarizer or the like. In addition, when the polarizing plate protective film is bonded to a polarizer formed of a polyvinyl alcohol film which is similarly prepared in the shape of a long film in a long shape, and then is practically incorporated in the liquid crystal display device, the optical film is used by being cut to have a desired size. One aspect of the optical compensation film which is wound in the shape of a roll includes an aspect in which the film is wound in the shape of a roll having a roll length of greater than or equal to 2500 m.

<<Hard Coat Layer>>

In the optical film of the present invention, the hard coat layer which is disposed on the cellulose acylate film as desired is a layer for applying hardness or scratch resistance to the optical film of the present invention. For example, a coating composition is applied onto the cellulose acylate film and is cured, and thus the hard coat layer having high adhesiveness with respect to the cellulose acylate film with the compound denoted by Formula (I) in the present invention is able to be formed. A filler or an additive is added into the hard coat layer, and thus mechanical performance, electrical performance, optical performance, physical performance, or chemical performance such as water repellency and oil repellency is able to be applied to the hard coat layer itself. The thickness of the hard coat layer is preferably 0.1 μm to 6 μm, and is more preferably 3 μm to 6 μm. By including a thin hard coat layer having a thickness in such a range, an optical film including the hard coat layer is obtained in which physical properties such as suppression of brittleness or curling are enhanced, and a reduction in weight and manufacturing costs are realized.

It is preferable that the hard coat layer is formed by curing a curable composition. It is preferable that the curable composition is prepared as a liquid-like coating composition. An example of such a coating composition contains a monomer or an oligomer for a matrix forming binder, polymers, and an organic solvent. This coating composition is cured after being applied, and thus the hard coat layer is able to be formed. In the curing, a cross-linking reaction or a polymerization reaction is able to be used.

(Monomer or Oligomer for Matrix Forming Binder)

Examples of the monomer or the oligomer for a matrix forming binder which is able to be used include an ionizing radiation curable multifunctional monomer and an ionizing radiation curable multifunctional oligomer. It is preferable that the multifunctional monomer or the multifunctional oligomer is a monomer which is able to be subjected to a cross-linking reaction or a polymerization reaction. Functional groups which are polymerized with light, an electron beam, and radiation are preferable as the functional group of the ionizing radiation curable multifunctional monomer or the ionizing radiation curable multifunctional oligomer, and among them, the photopolymerizable functional group is preferable.

Examples of the photopolymerizable functional group include an unsaturated polymerizable functional group such as a (meth)acryloyl group, a vinyl group, a styryl group, and an allyl group, and a ring opening polymerization type polymerizable functional group such as an epoxy-based compound, and among them, the (meth)acryloyl group is preferable. Specific examples of the photopolymerizable multifunctional monomer having a photopolymerizable functional group include (meth)acrylic diesters of alkylene glycol such as neopentyl glycol acrylate, 1,6-hexane diol (meth)acrylate, and propylene glycol di(meth)acrylate; (meth)acrylic diesters of polyoxy alkylene glycol such as triethylene glycol di(meth)acrylate, dipropylene glycol di(meth)acrylate, polyethylene glycol di(meth)acrylate, and polypropylene glycol di(meth)acrylate; (meth)acrylic diesters of polyvalent alcohol such as pentaerythritol di(meth)acrylate; (meth)acrylic diesters of an adduct of ethylene oxide or propylene oxide such as 2,2-bis{4-(acryloxy.diethoxy) phenyl} propane, and 2,2-bis{4-(acryloxy.polypropoxy) phenyl} propane; and the like.

Further, urethane (meth)acrylates, polyester (meth)acrylates, isocyanuric acid acrylates, and epoxy (meth)acrylates are also preferably used as the photopolymerizable multifunctional monomer.

Among them, esters of polyvalent alcohol and (meth)acrylate are preferable, and a multifunctional monomer having three or more (meth)acryloyl groups in one molecule is more preferable.

Specifically, (di)pentaerythritol tri(meth)acrylate, (di)pentaerythritol tetra(meth)acrylate, (di)pentaerythritol penta(meth)acrylate, (di)pentaerythritol hexa(meth)acrylate, tripentaerythritol triacrylate, tripentaerythritol hexatriacrylate, trimethylol propane tri(meth)acrylate, trimethylol ethane tri(meth)acrylate, ditrimethylol propane tetra(meth)acrylate, EO-modified trimethylol propane tri(meth)acrylate, PO-modified trimethylol propane tri(meth)acrylate, EO-modified phosphoric acid tri(meth)acrylate, 1,2,4-cyclohexane tetra(meth)acrylate, pentaglycerol triacrylate, 1,2,3-cyclohexane tetramethacrylate, polyester polyacrylate, caprolactone-modified tris(acryloxy ethyl) isocyanurate, and the like are included.

Herein, "(meth)acrylate", "(meth)acrylic acid", and "(meth)acryloyl" respectively indicate "acrylate or methacrylate", "acrylic acid or methacrylic acid", and "acryloyl or methacryloyl".

Further, examples of a resin having three or more (meth)acryloyl groups include a polyester resin, a polyether resin, an acrylic resin, an epoxy resin, a urethane resin, an alkyd resin, a spiroacetal resin, a polybutadiene resin, and a polythiol polyene resin which have a comparatively low molecular weight, an oligomer or a prepolymer of a multifunctional compound or the like such as polyvalent alcohol, and the like.

A specific compound of the multifunctional acrylate-based compounds having three or more (meth)acryloyl groups is able to refer to compounds disclosed in paragraph 0096 of JP2007-256844A and the like.

Examples of the urethane (meth)acrylates are able to include a urethane (meth)acrylate-based compound which is obtained by allowing hydroxyl group-containing compounds such as alcohol, polyol, and/or a hydroxyl group-containing (meth)acrylate to react with isocyanates, or as necessary, by esterifying a polyurethane compound obtained by this reaction with (meth)acrylate.

A specific example of the specific compound is able to refer to examples disclosed in paragraph 0017 of JP2007-256844A and the like.

It is preferable that the isocyanuric acid (meth)acrylates are used from a viewpoint of capable of reducing the curling. Examples of such isocyanuric acid (meth)acrylates include isocyanuric acid diacrylates and isocyanuric acid triacrylates, and an example of a specific compound is able to refer to examples disclosed in paragraphs 0018 to 0021 of JP2007-256844A and the like.

An epoxy-based compound is able to be used in the hard coat layer in order to further reduce contraction due to the curing. A monomer having two or more epoxy groups in one molecule is used as the monomers having such an epoxy group, and examples of the monomer having two or more epoxy groups in one molecule include epoxy-based monomers disclosed in each of JP2004-264563A, JP2004-264564A, JP2005-37737A, JP2005-37738A, JP2005-140862A. JP2005-140863A, JP2002-322430A, and the like. In addition, a compound having both functional groups of an epoxy-based functional group and an acrylic functional group, such as glycidyl (meth)acrylate, is also preferably used.

(High Molecular Compound)

The hard coat layer may contain a high molecular compound. By adding the high molecular compound, it is possible to decrease curing contraction, and it is possible to more preferentially adjust viscosity of the coating liquid relevant to dispersion stability of resin particles (aggregation properties). In addition, it is possible to change aggregation behavior of the resin particles by controlling the polarity of a solidified material during the drying or to reduce drying unevenness during the drying, and thus adding the high molecular compound is preferable.

The high molecular compound forms a polymer in advance at the time of being added into the coating liquid. Resins such as cellulose esters (for example, cellulose triacetate, cellulose diacetate, cellulose propionate, cellulose acetate propionate, cellulose acetate butyrate, cellulose nitrate, and the like), urethanes, polyesters, (meth)acrylic esters (for example, a methyl methacrylate/methyl (meth) acrylate copolymer, a methyl methacrylate/ethyl (meth) acrylate copolymer, a methyl methacrylate/butyl (meth) acrylate copolymer, a methyl methacrylate/styrene copolymer, a methyl methacrylate/(meth)acrylate copolymer, polymethyl methacrylate, and the like), and polystyrene are preferably used as such a high molecular compound.

(Curable Composition)

An example of a curable composition which is able to be used for forming the hard coat layer is a curable composition including a (meth)acrylate-based compound. It is preferable that the curable composition contains a photoradical polymerization initiator or a thermal radical polymerization initiator along with the (meth)acrylate-based compound, and as necessary, may further contain a filler, a coating auxiliary agent, and other additives. The curable composition is able to be cured by performing a polymerization reaction due to irradiation or heating of ionizing radiation in the presence of the photoradical polymerization initiator or the thermal radical polymerization initiator. It is possible to perform both of ionizing radiation curing and thermal curing. A commercially available compound is able to be used as an optical polymerization initiator and a thermal polymerization initiator, and the optical polymerization initiator and the thermal polymerization initiator are disclosed in "Newest UV Curing Technology" (p. 159, Publisher; Kazuhiro TAKAUSU, Publishing Office; published by Technical Information Institute Co., Ltd., in 1991) or in a catalog of BASF SE.

Another example of the curable composition which is able to be used for forming the hard coat layer is a curable composition containing an epoxy-based compound. It is preferable that the curable composition contains a photoacid generator generating cations due to the action of light along with the epoxy-based compound, and as necessary, may further contain a filler, a coating auxiliary agent, and other additives. The curable composition is able to be cured by performing a polymerization reaction due to light irradiation in the presence of the photoacid generator. Examples of the photoacid generator include an ionic compound such as a triaryl sulfonium salt and a diaryl iodonium salt, a nonionic compound such as nitrobenzyl ester of a sulfonic acid, and the like, and various known photoacid generators such as compounds disclosed in The Japanese Research Association for Organic Electronics Materials, "Organic Material for Imaging", published by Bunshin Design Printing Publishing And Digital Communications (1997), and the like are able to be used.

In addition, the (meth)acrylate-based compound and the epoxy-based compound may be used together, and in this case, it is preferable that an initiator such as a photoradical polymerization initiator or a thermal radical polymerization initiator, and a photocationic polymerization initiator are used together.

The curable composition which is particularly preferable for forming the hard coat layer is a composition containing a (meth)acrylate-based compound to be used in examples described below.

It is preferable that the curable composition is prepared as a coating liquid. The coating liquid is able to be prepared by dissolving and/or dispersing the components described above in an organic solvent.

(Properties of Hard Coat Layer)

The hard coat layer formed on the cellulose acylate film of the optical film of the present invention has high adhesiveness with respect to the cellulose acylate film. In particular, in the hard coat layer formed of the preferred curable composition described above on the cellulose acylate film containing the compound denoted by Formula (I), the curable composition is formed with higher adhesiveness with respect to the cellulose acylate film along with the compound denoted by Formula (I) in the present invention. Accordingly, the optical film of the present invention including such a cellulose acylate film and a hard coat layer maintains adhesiveness between the cellulose acylate film and the hard coat layer even when light irradiation or the like is performed, and has excellent optical durability.

It is preferable that the hard coat layer has excellent scratch resistance. Specifically, when a pencil hardness test which is an index of scratch resistance is performed, it is preferable that hardness of greater than or equal to 3H is attained.

[Polarizing Plate]

A polarizing plate of the present invention includes at least a polarizer and the optical film of the present invention. The optical film of the present invention has an excellent coloration suppression effect of the film due to light, and thus is preferably used as a polarizing plate protective film. It is preferable that the polarizing plate of the present invention includes the polarizer, and the optical film of the present invention on one surface or on both surfaces of the polarizer. The polarizer is an iodine-based polarizer, a dye-based polarizer using a dichromatic dye, or a polyene-based polarizer. The iodine-based polarizer and the dye-based polarizer are generally manufactured by using a polyvinyl alcohol-based film. When the optical film of the present invention is used as a polarizing plate protective film, a preparing method of the polarizing plate is not particularly limited, and the polarizing plate is able to be prepared by using a general method. For example, the general method is a method in which the cellulose acylate film of the optical film of the present invention is subjected to an alkali treatment, and the cellulose acylate film is bonded to both surfaces of the polarizer prepared by dipping and stretching a polyvinyl alcohol film in an iodine solution by using an aqueous solution of fully saponified polyvinyl alcohol. Instead of the alkali treatment, easy adhesion processing as disclosed in JP1994-94915A (JP-H06-94915A) and JP1994-118232A (JP-H06-118232A) may be performed. Examples of an adhesive agent used for bonding a treatment surface of the cellulose acylate film to the polarizer include a polyvinyl alcohol-based adhesive agent such as polyvinyl alcohol and polyvinyl butyral, vinyl-based latex such as butyl acrylate, and the like.

It is preferable that the optical film of present invention is bonded to the polarizer such that a transmission axis of the polarizer and a slow axis of the optical film of the present invention are substantially orthogonal to each other, parallel to each other, or at an angle of 45°. In a liquid crystal display device of the present invention, it is preferable that the transmission axis of the polarizer and the slow axis of the optical film of the present invention are substantially orthogonal to each other. Here, the expressions "substantially orthogonal and parallel" include a range of an error which is allowable in the art to which the present invention belongs. For example, the expressions "substantially orthogonal and parallel" include a range of less than ±10° from an exact angle relevant to parallel and orthogonal, and an error from the exact angle is preferably less than or equal to 5°, and is more preferably less than or equal to 3.

The transmission axis of the polarizer and the slow axis of the polarizing plate protective film being parallel to each other indicates that an angle between the direction of the main refractive index nx of the polarizing plate protective film and the direction of the transmission axis of the polarizer is in a range of ±10°. The range of such an angle is preferably within 50, is more preferably within 30, is even more preferably within 1°, and is most preferably within 0.50.

In addition, the transmission axis of the polarizer and the slow axis of the polarizing plate protective film being orthogonal to each other indicates that the direction of the main refractive index nx of the polarizing plate protective film and the direction of the transmission axis of the polarizer intersect with each other at an angle of 90°±10°. The angle is preferably 90°±5°, is more preferably 90°±3°, is even more preferably 900±1°, and is most preferably 90°±0.5°. By setting the range described above, a light leakage is able to be further reduced under a polarizing plate crossed-Nicols. The slow axis is able to be measured by various known methods, and for example, is able to be measured by using a birefringence meter (KOBRADH, manufactured by Oji Scientific Instruments).

The polarizing plate of the present invention includes not only a polarizing plate having a shape of of a film piece which is cut to have a size capable of being directly incorporated in the liquid crystal display device, but also a polarizing plate having a shape in which a film is prepared in the shape of a long film due to continuous production, and is wound into the shape of a roll (for example, a shape in which a roll length is greater than or equal to 2500 m or greater than or equal to 3900 m). In order to use the polarizing plate of the present invention for a large-screen liquid crystal display device, it is preferable that the width of the polarizing plate is greater than or equal to 1470 mm A specific configuration of the polarizing plate of the present invention is not particularly limited, but is able to adopt a known configuration, and for example, a configuration disclosed in FIG. 6 of JP2008-262161A is able to be adopted.

[Liquid Crystal Display Device]

The liquid crystal display device of the present invention includes at least a liquid crystal cell, and the polarizing plate of the present invention. In the liquid crystal display device of the present invention, when a polarizing plate includes a first polarizing plate and a second polarizing plate, a liquid crystal display device in a mode of IPS, OCB, or VA in which at least one polarizing plate is the polarizing plate of the present invention is preferable.

It is preferable that the liquid crystal display device of the present invention includes a liquid crystal cell (a liquid crystal layer), and polarizing plates which are laminated on both sides of the liquid crystal cell and are provided with an optical films on a surface on a side opposite to the liquid crystal cell side. That is, it is preferable that the liquid crystal display device of the present invention includes the first polarizing plate, the liquid crystal cell, and the second polarizing plate, and includes the optical film of the present invention on a surface on a side opposite to the polarizing plate surface side interposed between each of the polarizing plates and the liquid crystal cell. In the liquid crystal display device having such a configuration, display unevenness is excellently suppressed, and high display performance is exhibited.

In addition, it is preferable that the liquid crystal display device of the present invention includes the optical film in which the polarizing plate arranged on a visible side includes the hard coat layer on the surface of the optical film on the visible side, and in particular, includes the cellulose acylate film. In the liquid crystal display device having such a configuration, excellent scratch resistance and excellent optical durability are exhibited in addition to high display performance which is excellent for suppressing display unevenness.

Figure 2:
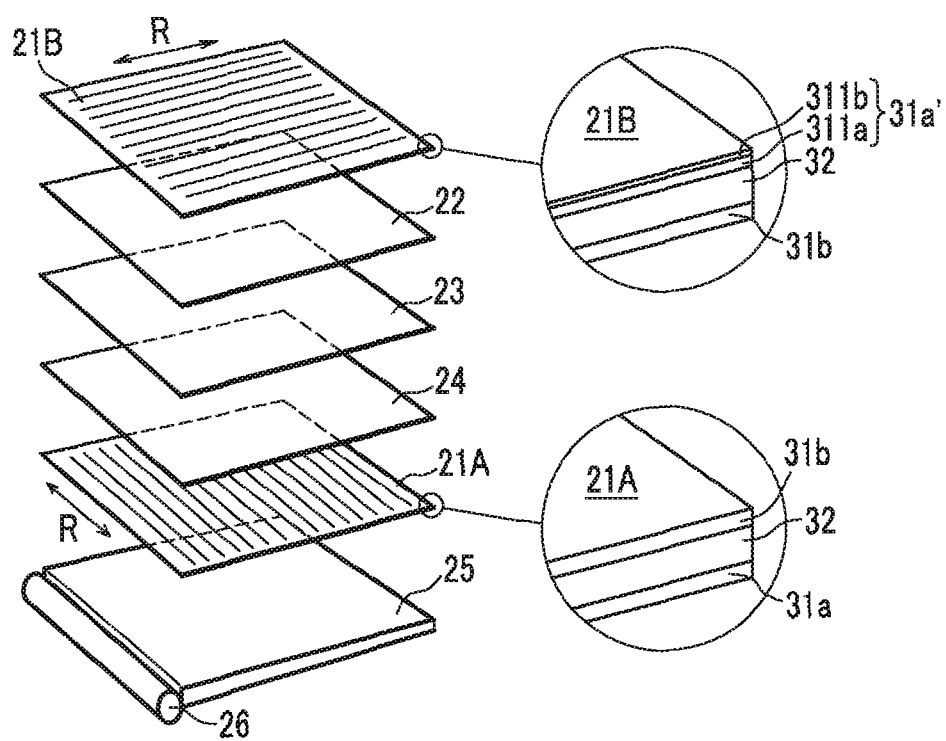
FIG. 2 is an example schematically illustrating an inner structure of another liquid crystal display device of the present invention.

An inner configuration of a typical liquid crystal display device which is the liquid crystal display device of the present invention are illustrated in FIG. 1 and FIG. 2. In FIG. 1, a liquid crystal display device is illustrated in which optical films 31a and 31b of the present invention which are formed of the cellulose acylate film include polarizing plates 21A and 21B arranged on both surfaces of a polarizer 32. In addition, in FIG. 2, a liquid crystal display device provided with an optical film 31a' in which the polarizing plate 21B arranged on the visible side includes a hard coat layer 311b on the surface of the polarizer 32 on the visible side through a cellulose acylate film 311a is illustrated.

Furthermore, FIG. 1 and FIG. 2 illustrate a configuration of an example of the liquid crystal display device of the present invention, and a specific configuration of the liquid crystal display device of the present invention is not particularly limited, but a known configuration is able to be adopted. In addition, a configuration disclosed in FIG. 2 of JP2008-262161A is also able to be preferably adopted.

EXAMPLES

Hereinafter, the present invention will be described in more detail with reference to examples, but the present invention is not limitedly interpreted by the examples.

[Synthesis of Compound Denoted by Formula (I)]

The compound denoted by Formula (I) in the present invention was synthesized as follows.

Representative synthesis examples of the compound are shown as follows.

Furthermore, the structure of the obtained compound was confirmed by using a $^1$H-NMR spectrum (300 MHz) and a mass spectrum (MALDI-TOF-MS).

Synthesis Example 1

An exemplificative compound (1-1) was synthesized by using the following reaction scheme.

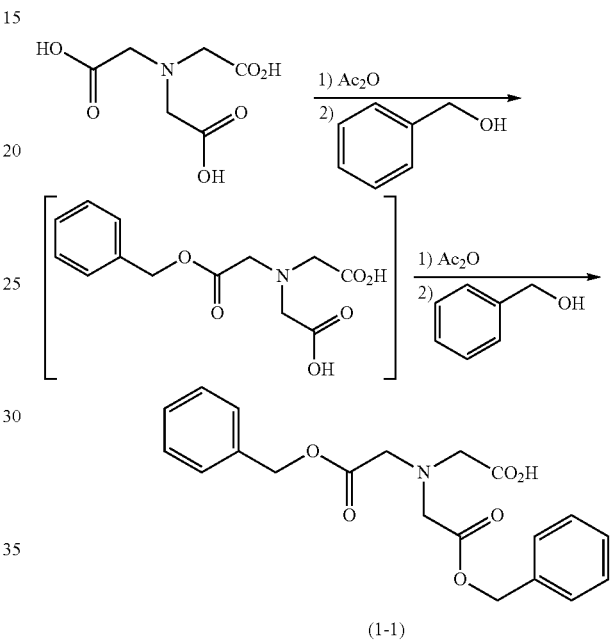

(1-1)

38.23 g (0.2 mol) of a nitrilotriacetic acid and 0.3 L of acetonitrile were put into a three neck flask of 1 L which was attached with a thermometer, a circulation cooling tube, and a stirrer, and were heated to 50° C. 37.97 g (0.48 mol) of pyridine was added to the mixture and was stirred at 50° C. for 15 minutes, 24.5 g (0.24 mol) of an acetic anhydride was gradually dripped thereto for 10 minutes and were stirred at 75° C. for 2 hours. After that, 25.95 g (0.24 mol) of benzyl alcohol was added to the mixture for 10 minutes, and was stirred at 75° C. for 2 hours. 24.5 g (0.24 mol) of an acetic anhydride was added to the mixture again and was stirred at 75° C. for 2 hours, and 25.95 g (0.24 mol) of benzyl alcohol was added thereto for 10 minutes and was stirred at 75° C. for 2 hours.

A reaction solution was cooled to room temperature, 2 L of ethyl acetate, 1 L of an aqueous solution of sodium chloride of 15%, and 60 mL of a concentrated hydrochloric acid were added to the reaction solution, and a water phase was removed. A remaining organic layer was washed with an aqueous solution of sodium chloride of 15% three times, and was dried with magnesium sulfate. Ethyl acetate was removed under reduced pressure, and thus 87.9 g of a crude material was obtained. After that, (200 ml/200 ml) of hexane/ethyl acetate was added to the mixture, an aqueous solution of sodium hydrogencarbonate was added thereto while being stirred, and the mixture was subjected to liquid separation, and thus the organic layer was removed. (200 ml/200 ml) of hexane/ethyl acetate was added to the mixture and was stirred, an aqueous solution of sodium hydrogencarbonate was added thereto, and thus the organic layer was removed. 37.8 mL (0.44 mol) of a concentrated hydrochloric acid was dripped into a remaining water layer such that the water layer was acidified, and extraction was performed by 0.5 L of ethyl acetate, and then washing was performed with 0.3 L of an aqueous solution of sodium chloride of 15%. After that, drying was performed with magnesium sulfate. Ethyl acetate was distilled under reduced pressure, and thus 61.3 g of an exemplificative compound (1-1) was obtained (a yield of 82%).

$^1$H-NMR (300 MHz, CDCl$_3$) δ=7.4-7.2 (m, 11H), 5.2-5.0 (m, 4H), 3.8-3.5 (m, 6H)

MS(MALDI) Exact mass calculated for [C$_{20}$H$_{21}$NO$_6$+ H$^+$]371.1. Found 371.2.

Compounds other than the compounds used in the example were synthesized by using the same method or a method similar to that described above.

[pKa Value of Compound Denoted by Formula (I)]

pKa of the obtained exemplificative compound was measured in a mixed solvent having a volume ratio of tetrahydrofuran (THF)/water (H$_2$O)=6/4 at 25° C. by an alkali titration method using automatic potentiometric titrator [AT-610: manufactured by Kyoto Electronics Manufacturing Co., Ltd.].

Hereinafter, the pKa value of a representative compound will be shown.

(pKa Value)

Exemplificative Compound (1-1) 6.0
Exemplificative Compound (1-7) 6.4
Exemplificative Compound (4-1) 6.5 and 8.1

Example 1

(Preparation of Cellulose Acylate)

Cellulose acylate having a total degree of acetyl substitution B of 2.87 was prepared. The cellulose acylate was added to a sulfuric acid (7.8 parts by mass with respect to 100 parts by mass of cellulose) as a catalyst, a carboxylic acid which was a raw material of an acyl substituent group was added thereto, and the mixture was subjected to an acylation reaction at 40° C. In addition, the mixture matured at 40° C. after the acylation. Further, a low molecular weight component of the cellulose acylate was washed with acetone and was removed.

(Preparation of Dope for Surface Layer)

Preparation of Cellulose Acylate Solution

The following compositions were put into a mixing tank, each component was dissolved by being stirred, and thus a cellulose acylate solution 101 was prepared.

| Composition of Cellulose Acylate Solution 101 | |
|---|---|
| Cellulose Acetate Having Total Degree of Acetyl Substitution (B) of 2.87 and Degree of Polymerization of 370 | 100.0 parts by mass |
| Comparative Compound (0-1) Shown in Table 1 Described below | 4.0 parts by mass |
| Monopet (Registered Trademark) SB (Plasticizer), manufactured by DKS Co., Ltd. | 9.0 parts by mass |
| SAIB-100 (Plasticizer), manufactured by Eastman Chemical Company | 3.0 parts by mass |
| Methylene Chloride (First Solvent) | 353.9 parts by mass |
| Methanol (Second Solvent) | 89.6 parts by mass |
| n-Butanol (Third Solvent) | 4.5 parts by mass |

Furthermore, Monopet (Registered Trademark) SB manufactured by DKS Co., Ltd. is benzoic acid ester of sucrose, and SAIB-100 manufactured by Eastman Chemical Company is an acetic acid and isobutyrate of sucrose.

Preparation of Matting Agent Solution

The following compositions were put into a dispersing machine, each component was dissolved by being stirred, and thus a matting agent solution 102 was prepared.

| Composition of Matting Agent Solution 102 | |
|---|---|
| Silica Particles Having Average Particle Size of 20 nm (AEROSIL R972, manufactured by Nippon Aerosil Co., Ltd.) | 2.0 parts by mass |
| Methylene Chloride (First Solvent) | 69.3 parts by mass |
| Methanol (Second Solvent) | 17.5 parts by mass |
| n-Butanol (Third Solvent) | 0.9 parts by mass |
| Cellulose Acylate Solution | 0.9 parts by mass |

Preparation of Ultraviolet Absorbent Solution

The following compositions were put into a mixing tank, each component was dissolved by being stirred while being heated, and thus an ultraviolet absorbent solution 103 was prepared.

| Composition of Matting Agent Solution 103 | |
|---|---|
| Ultraviolet Absorbent (UV-1) Described below | 20.0 parts by mass |
| Methylene Chloride (First Solvent) | 61.0 parts by mass |
| Methanol (Second Solvent) | 15.4 parts by mass |
| n-Butanol (Third Solvent) | 0.8 parts by mass |
| Cellulose Acylate Solution | 12.8 parts by mass |

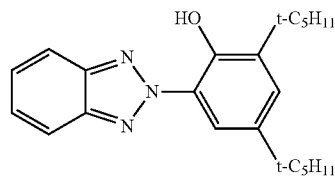

UV-1

1.3 parts by mass of the matting agent solution 102 described above and 3.4 parts by mass of the ultraviolet absorbent solution 103 described above were respectively filtered and then were mixed by using an inline mixer, 95.3 parts by mass of the cellulose acylate solution 101 was further added thereto and was mixed by using the inline mixer, and thus a solution for a surface layer was prepared.

(Preparation of Dope for Base Layer)

Preparation of Cellulose Acylate Solution

The following compositions were put into a mixing tank, each component was dissolved by being stirred, and thus a dope for a base layer was prepared.

| Composition of Cellulose Acylate Solution 201 | |
|---|---|
| Cellulose Acetate Having Total Degree of Acetyl Substitution (B) of 2.87 and Degree of Polymerization of 370 | 100. 0 parts by mass |
| Monopet (Registered Trademark) SB (Plasticizer), manufactured by DKS Co., Ltd. | 9.0 parts by mass |
| SAIB-100 (Plasticizer), manufactured by Eastman Chemical Company | 3.0 parts by mass |

-continued

| Composition of Cellulose Acylate Solution 201 | |
|---|---|
| Comparative Compound (0-1) Shown in Table 1 Described below | 4.0 parts by mass |
| Ultraviolet Absorbent (UV-1) | 2.0 parts by mass |
| Methylene Chloride (First Solvent) | 297.7 parts by mass |
| Methanol (Second Solvent) | 75.4 parts by mass |
| n-Butanol (Third Solvent) | 3.8 parts by mass |

(Casting)

The dope for a base layer prepared as described above and the dope for a surface layer on both sides thereof were concurrently and homogeneously casted onto a stainless steel casting support body (the temperature of the support body of −9° C.) in three layers from a casting port by using a drum casting device. The peeling off was performed in a state where the amount of residual solvent in the dope for each of the layers was approximately 70 mass %, and both ends of the film in a width direction were fixed by using a pin tenter and were dried while being stretched at a stretching ratio of 1.28 times (28%) in the TD direction in a state where the amount of residual solvent was 3 mass % to 5 mass %. After that, the drying was further performed by transporting the casted dope between rolls of a heat treatment device, and thus an optical film No. 101 of the comparative example was obtained. The thickness of the obtained optical film No. 101 was 60 μm, and the width thereof was 1480 mm.

Optical films Nos. 102, 103, and 106 of the comparative examples, and optical films Nos. 104 and 105 of the present invention were respectively prepared by the same method as that of the optical film No. 101 except that the type of compounds of all cellulose acylate solutions and the added amount thereof were changed as shown in Table 1 described below instead of the comparative compound (0-1) which was used in all of the cellulose acylate solutions for the surface layer and the base layer in the optical film No. 101.

Here, these optical films will also be referred to as a polarizing plate protective film hereinafter.

[Haze Evaluation]

The haze of each of the optical films obtained as described above was measured and was evaluated on the following criteria of A+ to C.

The haze was measured by measuring each of the optical films using a hazemeter "HGM-2DP" (a product name, manufactured by Suga Test Instruments Co., Ltd.) according to JIS K-7136.

—Evaluation Criteria—

A+: The haze of less than 0.1%

A: The haze of greater than or equal to 0.1% and less than 0.3%

B: The haze of greater than or equal to 0.3% and less than 0.7%

C: The haze of greater than or equal to 0.7%

(Saponification Treatment of Polarizing Plate Protective Film)

The optical films Nos. 101 to 106 were used as a polarizing plate protective film, and each of the polarizing plate protective films was dipped in 2.3 mol/L of an aqueous solution of sodium hydroxide at 55° C. for 3 minutes. The polarizing plate protective film was washed in a water washing bath at room temperature, and was neutralized at 30° C. by using 0.05 mol/L of a sulfuric acid. The polarizing plate protective film was washed again in the water washing bath at room temperature, and was further dried with hot air at 100° C. Thus, a saponification treatment was performed with respect to the surface of each of the polarizing plate protective films.

(Preparation of Polarizing Plate)

Iodine was adsorbed in a stretched polyvinyl alcohol film, and thus a polarizer was prepared.

The polarizing plate protective film which was subjected to the saponification treatment was bonded to one side of the polarizer by using a polyvinyl alcohol-based adhesive agent. A commercially available cellulose triacetate film (Fujitac TD80UF, manufactured by Fujifilm Corporation) was also subjected to the same saponification treatment, and the commercially available cellulose triacetate film which had been subjected to the saponification treatment was bonded to the surface of the polarizer on a side opposite to the surface side onto which the polarizing plate protective film subjected to the saponification treatment was bonded by using the polyvinyl alcohol-based adhesive agent.

At this time, a transmission axis of the polarizer and a slow axis of the polarizing plate protective film which had been subjected to the saponification treatment were arranged to be parallel to each other. In addition, the transmission axis of the polarizer and a slow axis of the commercially available cellulose triacetate film which had been subjected to the saponification treatment were arranged to be orthogonal to each other.

Thus, each polarizing plate corresponding to each of the optical films Nos. 101 to 106 was prepared.

(Evaluation of Polarizer Durability)

A polarizer durability test was performed in a state where the polarizing plate was bonded to glass through an adhesive agent as follows.

Two samples (approximately 5 cm×5 cm) were prepared in which the polarizing plate was bonded onto glass such that the cellulose acylate film of the present invention was on an air boundary side.

Orthogonal transmittance measurement of a single plate was performed by setting a side of the cellulose acylate film of the present invention in this sample to be directed towards a light source.

Each of the two samples was measured, and the average value thereof was set to orthogonal transmittance of the polarizing plate of the present invention.

The orthogonal transmittance of the polarizing plate was measured in a range of 380 nm to 780 nm by using an automatic polarizing film measurement device VAP-7070 manufactured by Jasco Corporation, and a measured value at 410 nm was adopted.

After that, the sample was aged and held under conditions described below, and the orthogonal transmittance was measured by using the same method.

A change rate in the orthogonal transmittance before and after aging was obtained by [(Difference between Orthogonal Transmittance before and Orthogonal Transmittance after Aging)/(Orthogonal Transmittance before Aging)]× 100, and the change rate was evaluated as the polarizer durability on the basis of the following criteria.

Furthermore, relative humidity under an environment where the humidity was not adjusted was in a range of 0% to 20%.

Evaluation Method

—Aging Conditions—

The polarizing plate was stored under an environment of a temperature of 80° C. and relative humidity of 90% for 250 hours.

—Evaluation Criteria—
A: The change rate in the orthogonal transmittance before and after aging of less than 0.7%
B: The change rate in the orthogonal transmittance before and after aging of greater than or equal to 0.7% and less than 0.8%
C: The change rate in the orthogonal transmittance before and after aging of greater than or equal to 0.8% and less than 0.1%
D: The change rate in the orthogonal transmittance before and after aging of greater than or equal to 1.0/o

[Evaluation Method of Volatility]

The compound denoted by Formula (I) in the present invention was heated from room temperature to 140° C. by using a TG/DTA measurement device (TG/DTA7200 manufactured by Hitachi High-Tech Science Corporation), a change rate of the mass of the compound at the time of being held at 140° C. for 1 hour (a change rate with respect to the mass before being heated) was measured, and the volatility was evaluated on the basis of the following criteria.

—Evaluation Criteria—
A: The change rate of the mass of less than or equal to 0.2%
B: The change rate of the mass of greater than or equal to 0.2% and less than 0.5%
C: The change rate of the mass of greater than or equal to 0.5%

[Measurement of pKa]

The measurement of pKa was measured by the same method as that in Synthesis of Compound Denoted by Formula (I), and was performed as follows.

The pKa of the compound of the present invention and the comparative compound in a mixed solvent having a volume ratio of tetrahydrofuran (THF)/water ($H_2O$)=6/4 at 25° C. was measured by an alkali titration method using automatic potentiometric titrator (AT-610: manufactured by Kyoto Electronics Manufacturing Co., Ltd.).

Here, comparative compounds 0-1 and 0-3 are an inorganic acid A and an inorganic acid B disclosed in paragraph 0133 of JP2011-118135A. In addition, a comparative compound 0-2 is a compound denoted in JP2012-72348A.

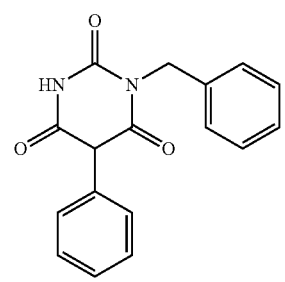

Comparative Compound (0-1)

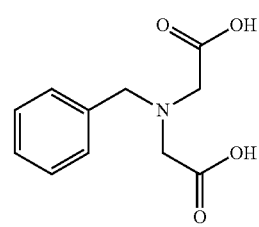

Comparative Compound (0-2)

TABLE 1

| Film No. | Additive Compound Number | Additive Compound Type | Added Amount[Note 1] | Polarizer Durability 80° C. 90% RH 250 h | Haze | Volatility | pKa | Note |
|---|---|---|---|---|---|---|---|---|
| 101 | Comparative Compound (0-1) | Barbituric Acid | 4 | B | A | B | 3.7 | Comparative Example |
| 102 | Comparative Compound (0-2) | Iminodiacetic Acid | 4 | D | C | B | 3.2 | Comparative Example |
| 103 | Comparative Compound (0-3) | Monocarboxylic Acid | 4 | D | A | A | 6.6 | Comparative Example |
| 104 | Exemplificative Compound (1-1) | Monocarboxylic Acid | 4 | A | A+ | A | 6.0 | Present Invention |
| 105 | Exemplificative Compound (1-7) | Monocarboxylic Acid | 4 | B | A+ | A | 6.4 | Present Invention |
| 106 | — | — | — | D | A+ | A[Note 2] | — | Comparative Example |

[Note 1] Added Amount of Additive: Part by mass per 100 parts by mass of cellulose acylate.
[Note 2] Blend of other additives such as an ultraviolet absorbent or a plasticizer contained in the prepared cellulose acylate film was measured.

Comparative Compound (0-3)

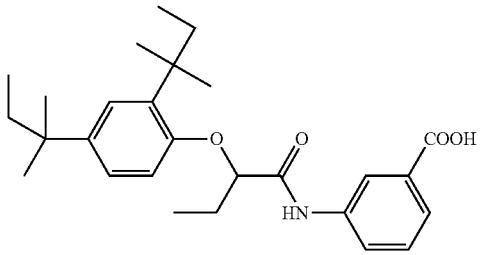

From the results of Table 1, all of the compounds denoted by Formula (I) in the present invention had an excellent volatility suppression effect from the film, and the optical film (the polarizing plate protective film) in the present invention containing the compounds described above also had excellent haze reduce effect of the film. Further, the polarizing plate protective film of the present invention containing the compound denoted by Formula (I) in the present invention had excellent polarizer durability in aging, and deterioration of the polarizer was effectively suppressed. It is considered that the volatility suppression effect of the compound and the compatibility of the compound with respect to the cellulose acylate are excellent, and thus it is possible to maintain an effective concentration of the compound in the film, and the polarizer durability is enhanced according to aging.

In contrast, the polarizing plate protective film containing the comparative compounds (0-2) and (0-3) had a large haze value of the film, and it was difficult to assure the polarizer durability in aging. It is considered that the volatility suppression effect of the comparative compound (0-2) and the compatibility of the comparative compound (0-2) with respect to the cellulose acylate are insufficient, and thus the performance thereof deteriorates.

On the other hand, the polarizing plate protective film containing the comparative compound (0-1) exhibited the compatibility with respect to the cellulose acylate, but the volatility suppression effect was insufficient.

In a polarizing plate protective film of the comparative example (a film No. 106) which did not contain both of the compound denoted by Formula (I) in the present invention and the comparative compound, the polarizer durability deteriorated compared to the polarizing plate protective film which was the optical film of the present invention. From the result, it was found that the compound denoted by Formula (I) in the present invention was able to enhance the polarizer durability without increasing the haze.

Example 2

(Preparation of Optical Film Attached with Hard Coat Layer)

A hard coat layer solution having the following curable composition was applied onto the surface of each optical film before preparing the polarizing plate prepared in Example 1 and was cured by being irradiated with an ultraviolet ray, and thus an optical film attached with a hard coat layer was prepared on which a hard coat layer having a thickness of 6 μm was formed.

Furthermore, in Table 2 described below, a common film No. is applied to a single-layered optical film No. and an optical film attached with a hard coat layer No. corresponding the single-layered optical film No.

| Curable Composition of Hard Coat Layer Solution | |
|---|---|
| Monomer Pentaerythritol Triacrylate/ Pentaerythritol Tetraacrylate (Mixed Mass Ratio of 3/2) | 53.5 parts by mass |
| UV Polymerization Initiator Irgacure™907 (manufactured by BASF SE) | 1.5 parts by mass |
| Ethyl Acetate | 45 parts by mass |

(Evaluation Method of Adhesiveness)

Each of the optical films Nos. 101 to 106 attached with a hard coat layer prepared as described above was subjected to a crosscut test based on JIS K 5600. Specifically, the optical film attached with a hard coat layer which had been cured was irradiated with Xe for 48 hours. 100 crosscuts having 1 mm square were prepared by putting 11 horizontal and vertical cuts in the hard coat layer at intervals of 1 mm after the Xe irradiation. Cellophane tape and Mylar tape were bonded onto 100 crosscuts and rapidly peeled off, and then the peeled off portion was subjected to adhesion evaluation by visual observation. Furthermore, the Xe irradiation was performed by using a super xenon weather meter SX75 manufactured by Suga Test Instruments Co., Ltd.

The adhesiveness was evaluated on the following criteria. When the evaluation is greater than or equal to "B", adhesiveness between the cellulose acylate film and the hard coat layer is high, and excellent optical durability is expressed.

Evaluation Criteria of Adhesiveness

A: The peeled off portion of 0 mass to 30 mass

B: The peeled off portion of 31 mass to 50 mass

C: The peeled off portion of 51 mass to 80 mass

D: The peeled off portion of greater than or equal to 81 mass

The obtained results are shown in Table 2 described below.

TABLE 2

| | Additive | | | | |
|---|---|---|---|---|---|
| Film No. | Compound Number | Compound Type | Added Amount[Note 1] | Adhe-siveness | Note |
| 101 | Comparative Compound (0-1) | Barbituric Acid | 4 | C | Comparative Example |
| 102 | Comparative Compound (0-2) | Imino-diacetic Acid | 4 | C | Comparative Example |
| 103 | Comparative Compound (0-3) | Monocar-boxylic Acid | 4 | D | Comparative Example |
| 104 | Exemplificative Compound (1-1) | Monocar-boxylic Acid | 4 | B | Present Invention |
| 105 | Exemplificative Compound (1-7) | Monocar-boxylic Acid | 4 | B | Present Invention |
| 106 | — | — | — | A[Note 2] | Comparative Example |

[Note 1] Added Amount of Additive: Part by mass per 100 parts by mass of cellulose acylate.
[Note 2] Blend of other additives such as an ultraviolet absorbent or a plasticizer contained in the prepared cellulose acylate film was measured.

The optical films Nos. 104 and 105 attached with a hard coat layer of the present invention had excellent adhesiveness compared to the optical film using the comparative compound. It is considered that this is because when an absorption wavelength in the film is shortened, deterioration of the cellulose acetate due to the light irradiation is suppressed.

Example 3

(Optical Film: Preparation and Evaluation of Cellulose Acylate Film)

The following compositions were put into a mixing tank, each component was dissolved by being stirred, and thus a cellulose acetate solution was prepared.

| Composition of Cellulose Acetate Solution | |
|---|---|
| Cellulose Acetate Having Total Degree of Acetyl Substitution (B) of 2.87 and Degree of Polymerization of 370 | 100.0 parts by mass |
| Exemplificative Compound (1-7) | 4.0 parts by mass |
| Ultraviolet Absorbent (UV-2) Described below | 2.0 parts by mass |
| Monopet (Registered Trademark) SB (Plasticizer), manufactured by DKS Co., Ltd. | 9.0 parts by mass |
| SAIB-100 (Plasticizer), manufactured by Eastman Chemical Company | 3.0 parts by mass |
| Methylene Chloride (First Solvent) | 78.3 parts by mass |
| Methanol (Second Solvent) | 11.7 parts by mass |

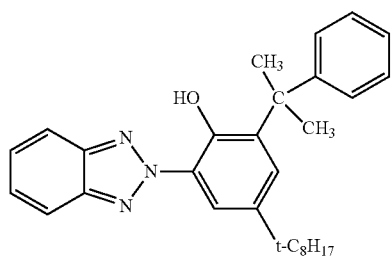

UV-2

The cellulose acetate solution was casted by using a band casting machine, and was dried at 100° C. until a residual solvent content became 40%, and then a film was peeled off. The peeled off film was further dried at an atmospheric temperature of 140° C. for 20 minutes. The film thickness of the obtained optical film (a cellulose acylate film No. 204 of the present invention) was 25 μm.

Further, in the cellulose acylate film No. 204, a cellulose acylate film No. 201 of the comparative example and cellulose acylate films Nos. 202, 203, and 205 to 211 of the present invention were prepared by the same method as that of the cellulose acylate film No. 204 except that the type of exemplificative compound to be added and the added amount thereof, and the type of plasticizer and the added amount thereof were changed as shown in Table 3 described below The volatility of the additive and the haze of the cellulose acylate film were evaluated by the same method as that in Example 1.

A polarizing plate was prepared by the same method as that in Example 1 using the cellulose acylate films Nos. 202 to 211 of the present invention and the cellulose acylate film No. 201 of the comparative example, and thus the polarizer durability was evaluated.

Furthermore, the polarizer durability was evaluated by the following aging conditions, and the obtained results were evaluated by the following evaluation criteria.

—Aging Conditions—

Aging Performed for 650 Hours under Environment of Temperature of 60° C. and Relative Humidity of 95%

Evaluation Criteria of Polarizer Durability

A: The change rate in the orthogonal transmittance before and after aging of less than 0.3%

B: The change rate in the orthogonal transmittance before and after aging of greater than or equal to 0.3% and less than 0.5%

C: The change rate in the orthogonal transmittance before and after aging of greater than or equal to 0.5% and less than 0.7%

D: The change rate in the orthogonal transmittance before and after aging of greater than or equal to 0.7%

The obtained results are collectively shown in Table 3 described below.

TABLE 3

| Film No. | Additive Compound Number | Added Amount[Note 1] | Polarizer Durability | Haze | Volatility | Note |
|---|---|---|---|---|---|---|
| 201 | None | 0 | D | A+ | A | Comparative Example |
| 202 | Exemplificative Compound (1-1) | 4 | A | A+ | A | Present Invention |
| 203 | Exemplificative Compound (1-2) | 4 | A | A+ | A | Present Invention |
| 204 | Exemplificative Compound (1-7) | 4 | B | A+ | A | Present Invention |
| 205 | Exemplificative Compound (2-1) | 4 | B | A+ | A | Present Invention |
| 206 | Exemplificative Compound (3-8) | 4 | B | A+ | A | Present Invention |
| 207 | Exemplificative Compound (4-1) | 2 | B | A | A | Present Invention |
| 208 | Exemplificative Compound (4-7) | 2 | B | A | A | Present Invention |
| 209 | Exemplificative Compound (5-1) | 4 | A | A+ | A | PPresent Invention |
| 210 | Exemplificative Compound (5-2) | 4 | A | A+ | A | Present Invention |
| 211 | Exemplificative Compound (5-3) | 4 | A | A+ | A | Present Invention |

Note [1] Added Amount of Additive: Part by mass per 100 parts by mass of cellulose acylate.

In the polarizing plate using the cellulose acylate films Nos. 202 to 211 of the present invention, a change rate in the orthogonal transmittance before and after aging was reduced and deterioration of the polarization performance was suppressed, compared to the polarizing plate using the cellulose acylate film No. 201 of the comparative example.

Example 4

Corresponding cellulose acylate films Nos. 302, 304, and 311 were prepared by the same method as that in Example 3 except that a plasticizer P described below was used in the following blended amount instead of Monopet SB and SAIB-100 which were the plasticizer of cellulose acylate films Nos. 202, 204, and 211 in Example 3, and each polarizing plate was prepared by the same method as that in Example 1 and was evaluated.

Plasticizer P:

Polycondensate of Phthalic Acid/Ethane Diol, in Which Terminals are Acetic Acid Ester Group and which Has Number Average Molecular Weight of 800 10.0 parts by mass

TABLE 4

| Film No. | Additive | | Polarizer | | | Note |
|---|---|---|---|---|---|---|
| | Compound Number | Added Amount[Note 1] | Durability | Haze | Volatility | |
| 302 | Exemplificative Compound (1-1) | 4 | A | A+ | A | Present Invention |
| 304 | Exemplificative Compound (1-7) | 4 | B | A+ | A | Present Invention |
| 311 | Exemplificative Compound (5-3) | 4 | A | A+ | A | Present Invention |

[Note 1] Added Amount of Additive: Part by mass per 100 parts by mass of cellulose acylate.

In the polarizing plate using the cellulose acylate films Nos. 302, 304, and 311 of the present invention, a change rate in the orthogonal transmittance before and after aging was reduced and deterioration of the polarization performance was suppressed, as with the polarizing plate prepared by using the cellulose acylate films Nos. 201, 204, and 211 of the present invention in Example 3. In addition, the haze of the film was not observed.

As described in Examples 1 to 4, by using the polarizing plate of the present invention, it is possible to prepare a liquid crystal display device having excellent performance as described above.

The present invention is described with reference to the embodiments, but the present invention is not limited thereto unless otherwise specifically stated, and is able to be widely interpreted within the scope and the gist of claims.

Priority is claimed on JP2013-158278, filed on Jul. 30, 2013, the content of which is incorporated herein as a part by reference.

EXPLANATION OF REFERENCES 21A, 21B: polarizing plate
22: color filter substrate
23: liquid crystal layer (liquid crystal cell)
24: array substrate
25: light guide plate
26: light source
31a, 31a', 31b: optical film (polarizing plate protective film)
311a: cellulose acylate film
311b: hard coat layer
32: polarizer
R: polarization direction

What is claimed is:

1. An optical film having a haze value of less than 0.3%, containing at least one layer containing greater than or equal to 80 mass % of cellulose acylate and at least one type of a compound denoted by the following Formula (I),

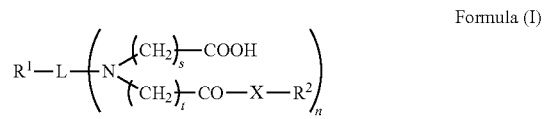

Formula (I)

wherein in Formula (I), $R^1$ represents a hydrogen atom, an alkyl group, an alkenyl group, an aryl group, a heterocyclic group, an acyl group, an alkoxy carbonyl group, a carbamoyl group, an alkyl sulfonyl group, or an aryl sulfonyl group, $R^2$ represents an alkyl group or an aryl group, L represents a single bond or a bivalent or more connecting group, n represents 1 when L is a single bond and n represents an integer of the valence of L-1 when L is a bivalent or more connecting group, s and t each independently represent 1, 2, or 3, X represents —O— or —N(Ra)—, and here, Ra represents a hydrogen atom or an alkyl group, wherein a total degree of acyl substitution A of the cellulose acylate satisfies the following formula:

$1.5 \leq A \leq 3.0$, and wherein the at least one type of a compound has a change rate of the mass of less than or equal to 0.2% when held at 140° C. for 1 hour.

2. The optical film according to claim 1, wherein L is a single bond, an alkylene group, or an alkanetriyl group.

3. The optical film according to claim 1, wherein L is an alkylene group.

4. The optical film according to claim 1, wherein the compound denoted by Formula (I) is a compound denoted by the following Formula (II), and

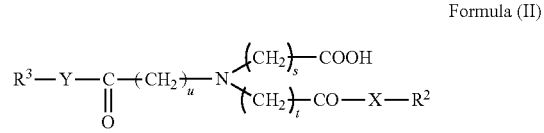

Formula (II)

in Formula (II), $R^2$ represents an alkyl group or an aryl group, s, t, and u each independently represent 1, 2, or 3, X and Y each independently represent —O— or —N(Ra)—, and here, Ra represents a hydrogen atom or an alkyl group, and $R^3$ represents an alkyl group or an aryl group.

5. The optical film according to claim 1, wherein $R^2$ is an alkyl group which may be substituted with an aryl group or with a cycloalkyl group.

6. The optical film according to claim 1, wherein $R^2$ is denoted by the following Formula (1) or (2), and

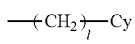 Formula (1)

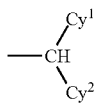 Formula (2)

in Formulas (1) and (2), l represents an integer of 1 to 5, and Cy, $Cy^1$, and $Cy^2$ each independently represent an aryl group or a cycloalkyl group.

7. The optical film according to claim 1, wherein an acyl group of the cellulose acylate is an acetyl group, and a total degree of acetyl substitution B satisfies the following Formula, $2.0 \leq B \leq 3.0$ 8. The optical film according to claim 7, wherein the total degree of acetyl substitution B is greater than or equal to 2.5 and less than 2.97.

9. The optical film according to claim 1, wherein the optical film contains at least one type of a plasticizer.

10. The optical film according to claim 1, wherein the optical film is formed of at least two layers including a layer containing the cellulose acylate and at least one type of the compound denoted by Formula (I), and a hard coat layer.

11. A polarizing plate, comprising:
a polarizer; and
the optical film according to claim 1 on at least one surface of the polarizer.

12. A liquid crystal display device, at least comprising:
the polarizing plate according to claim 11; and
a liquid crystal cell.

\* \* \* \* \*